United States Patent [19]
Grzybowski et al.

[11] 3,937,894
[45] Feb. 10, 1976

[54] ADDRESSABLE TICKETING SCANNER

[75] Inventors: George T. Grzybowski, Westchester; David E. Gaon, Villa Park, both of Ill.; Bryan F. Gearing, Bedford, Mass.; Martin R. Winandy, La Grange, Ill.

[73] Assignee: GTE Automatic Electric Laboratories Incorporated, Northlake, Ill.

[22] Filed: Jan. 18, 1974

[21] Appl. No.: 434,743

[52] U.S. Cl. .............................................. 179/7.1 R
[51] Int. Cl.² ........................................ H04M 15/18
[58] Field of Search...179/7 R, 7.1 R, 7 MM, 7.1 TP, 179/8 R

[56] References Cited
UNITED STATES PATENTS

| | | | |
|---|---|---|---|
| 3,653,003 | 3/1972 | Hemdal | 179/7 R |
| 3,697,695 | 10/1972 | Pommerening et al. | 179/7 MM |
| 3,806,652 | 4/1974 | Woolf et al. | 179/7.1 R |

FOREIGN PATENTS OR APPLICATIONS

| | | | |
|---|---|---|---|
| 1,260,391 | 1/1972 | United Kingdom | 179/7.1 R |

*Primary Examiner*—Kathleen H. Claffy
*Assistant Examiner*—Gerald L. Brigance

[57] ABSTRACT

An automatic toll ticketing system for use in a communication switching system includes an addressable scanner having common control apparatus controlled by the common control apparatus to effect the interrogation of a preselected group of scan points, associated with busy paths established through a switching network of the switching system, in accordance with address data supplied by the common control apparatus which identifies the busy paths.

14 Claims, 28 Drawing Figures

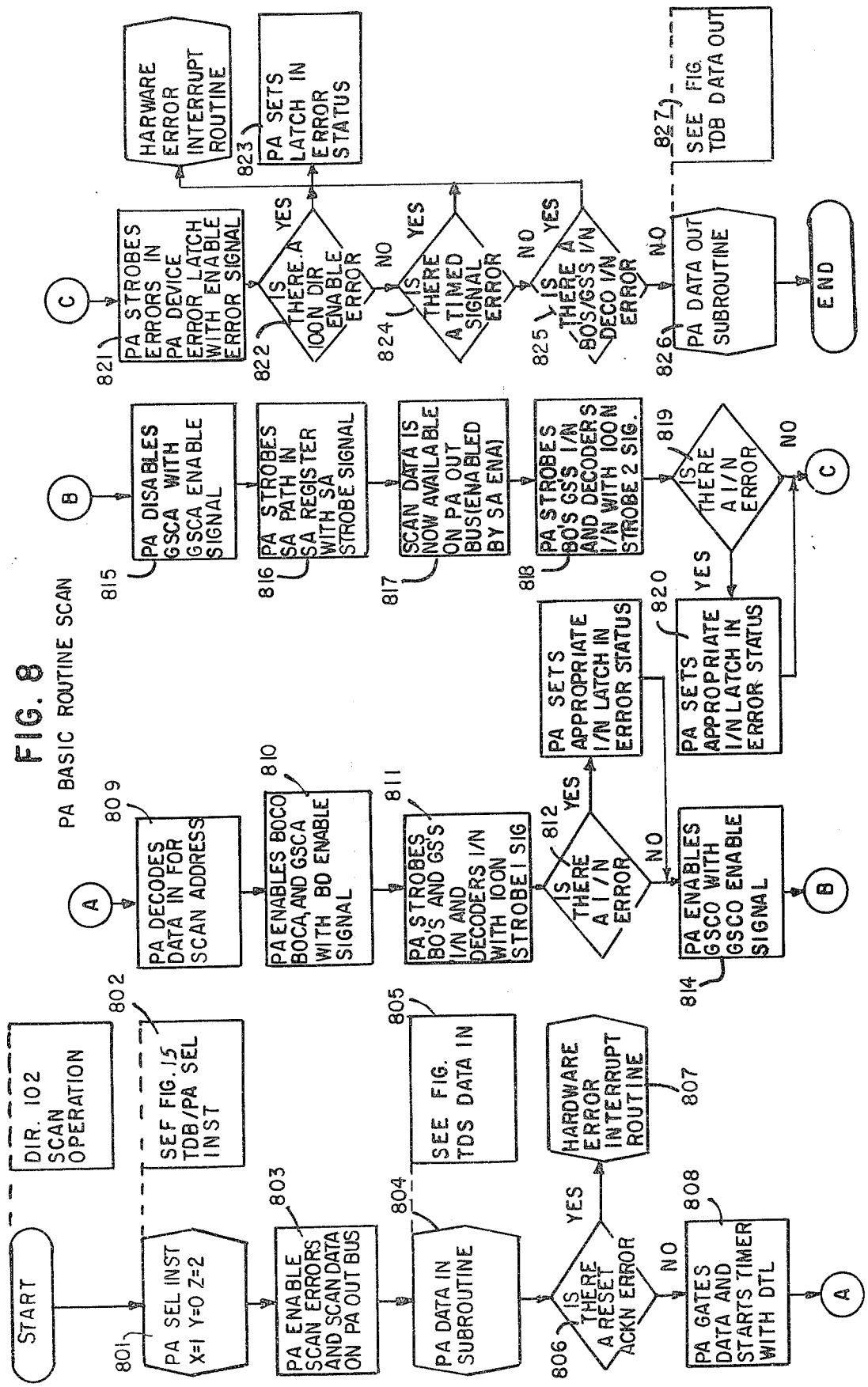

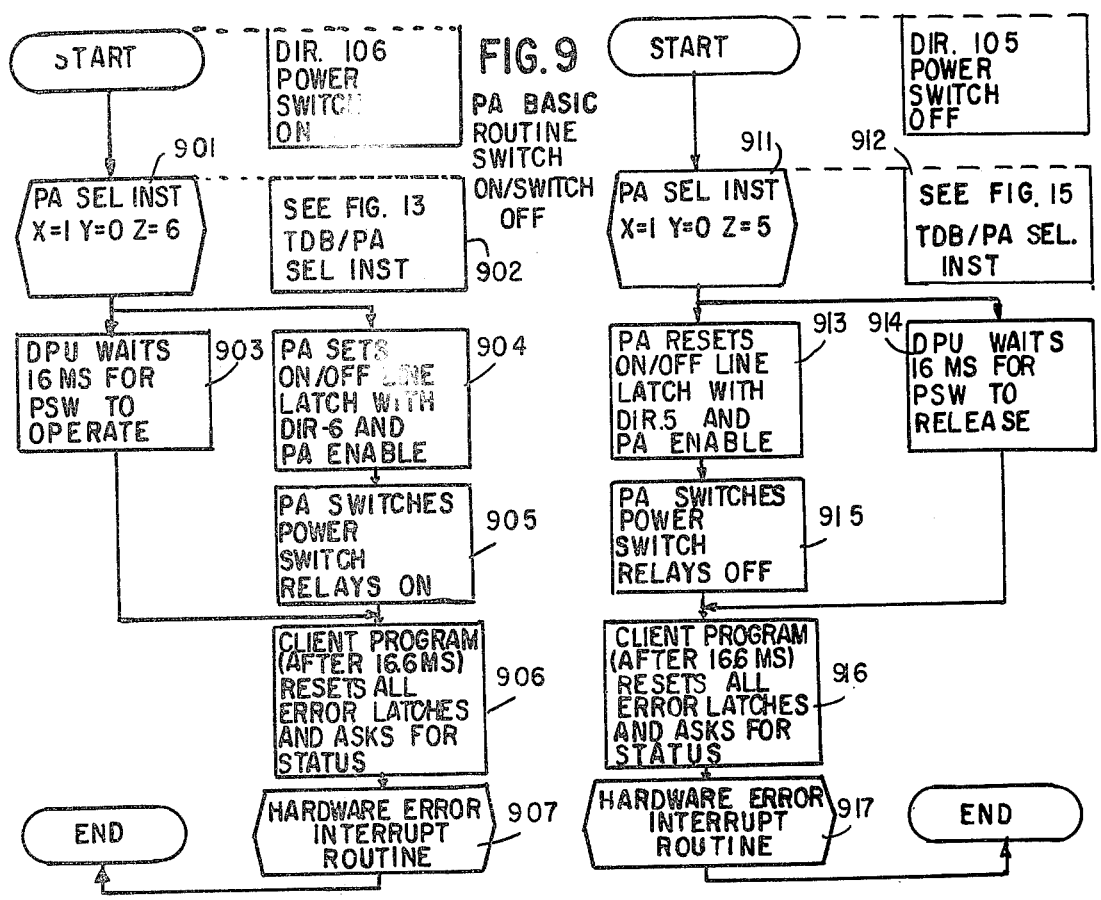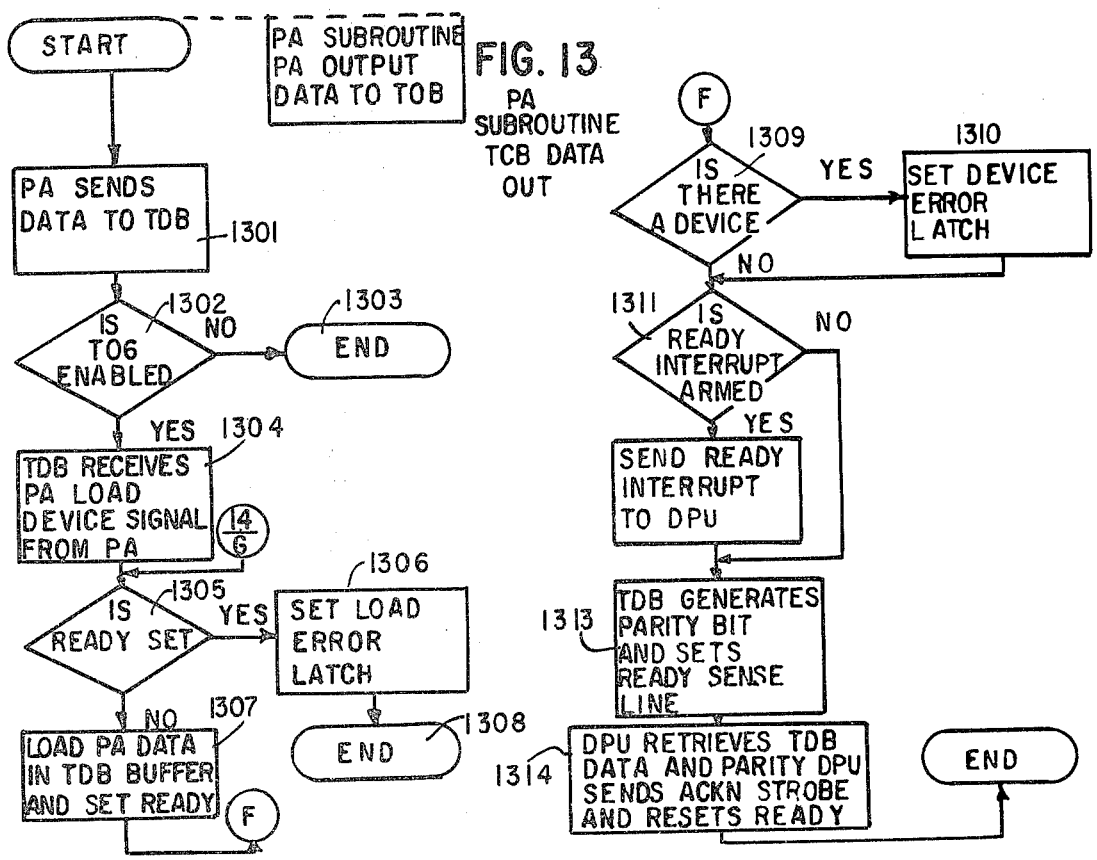

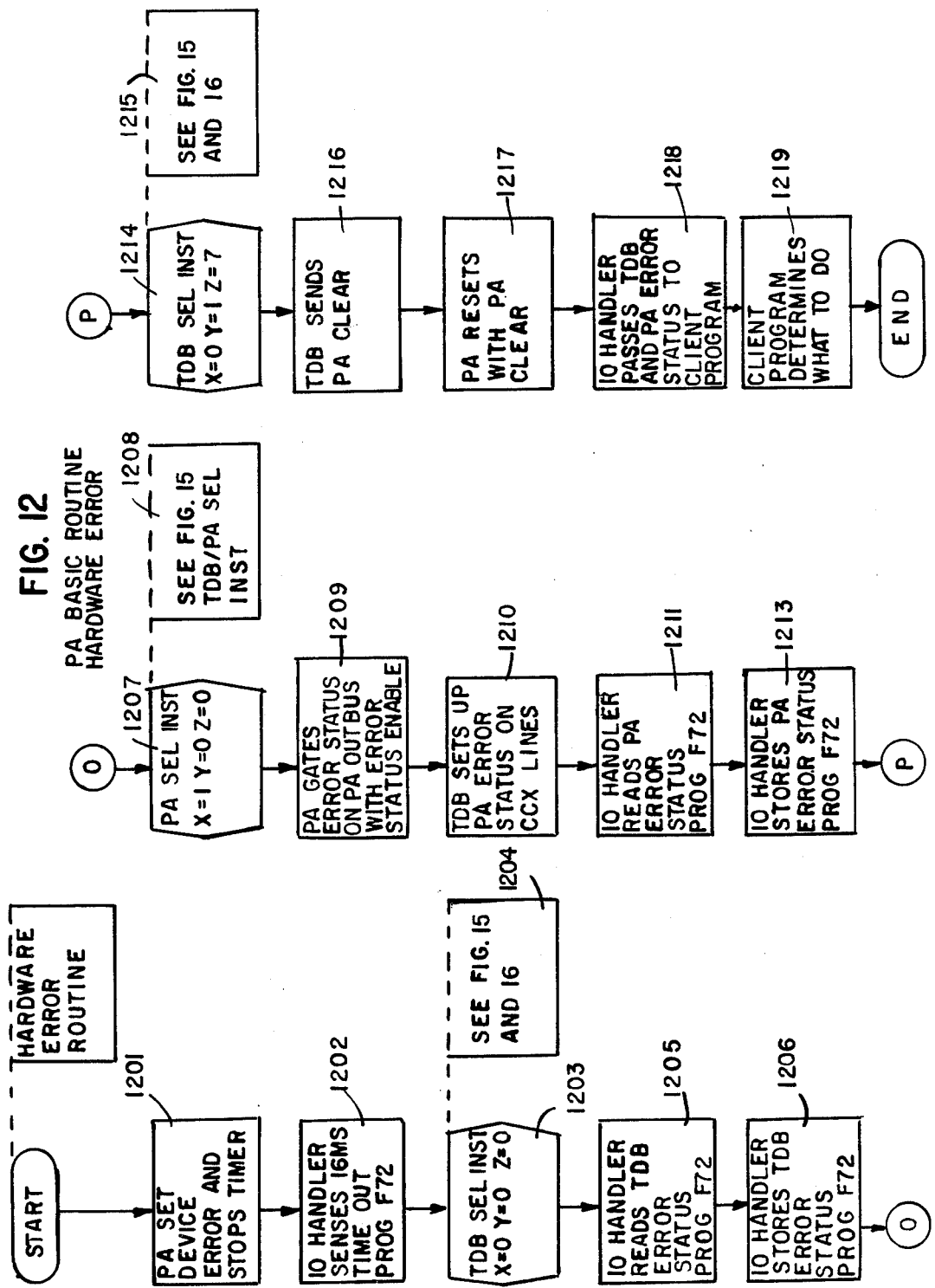

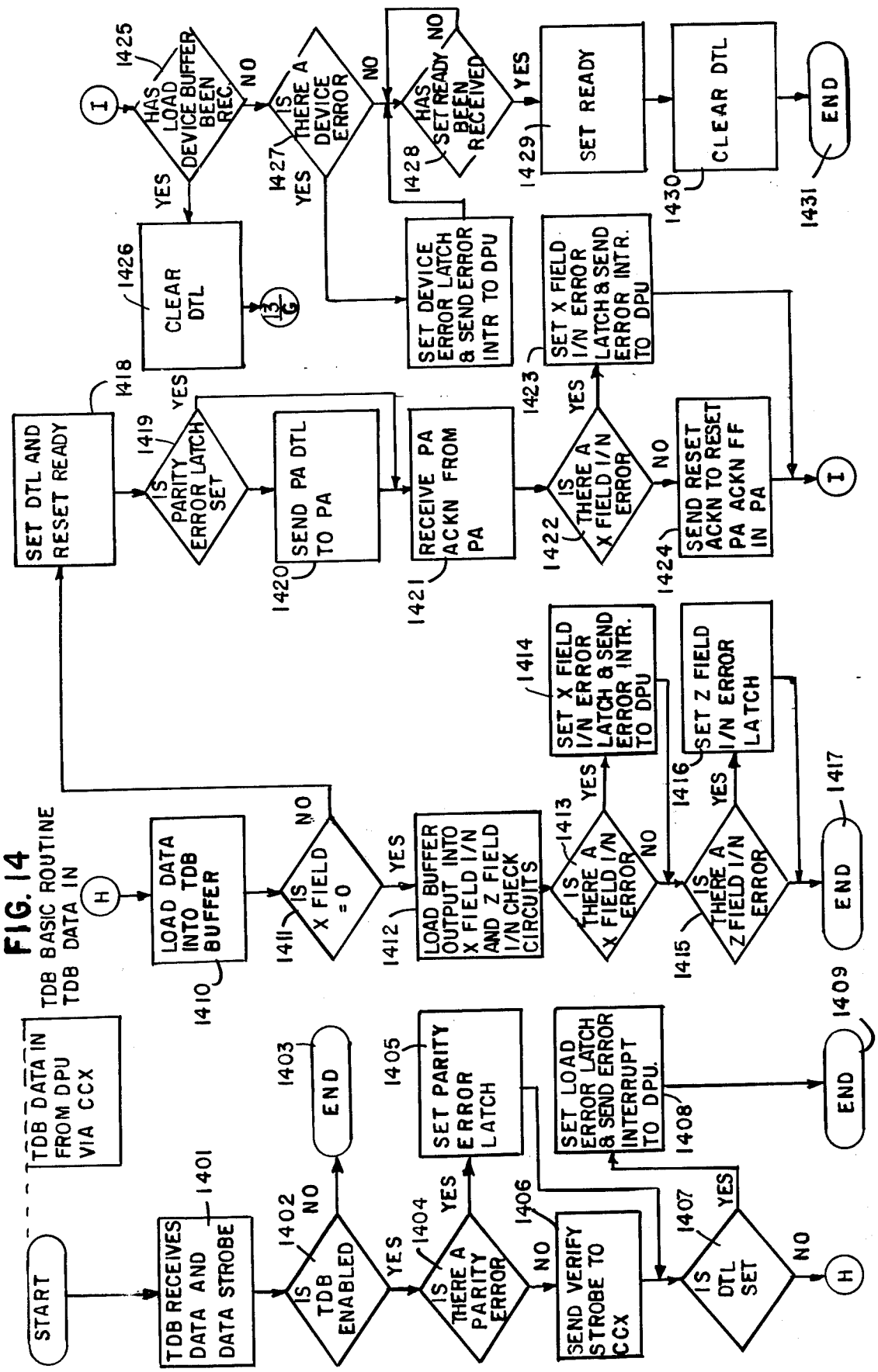

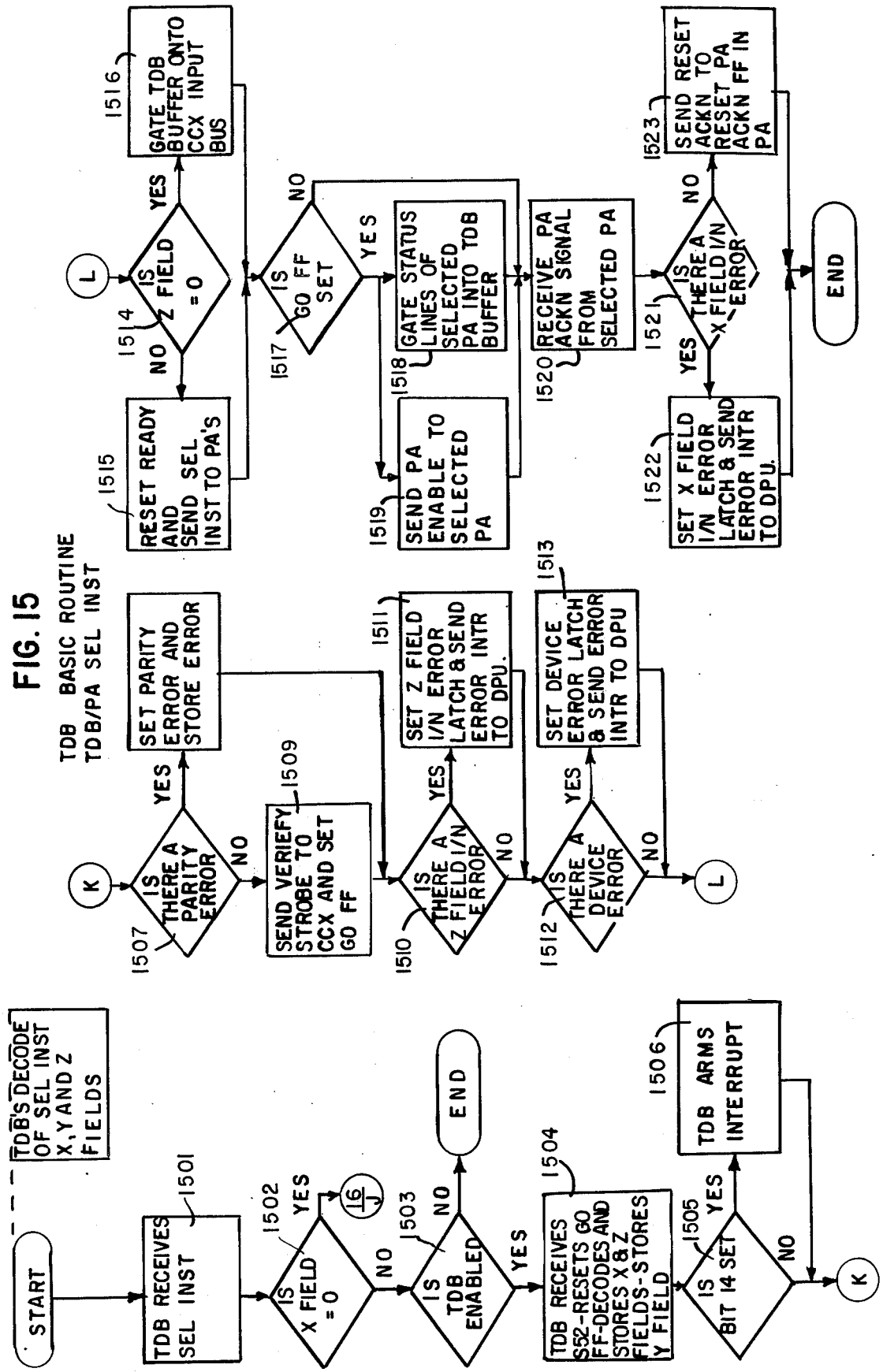

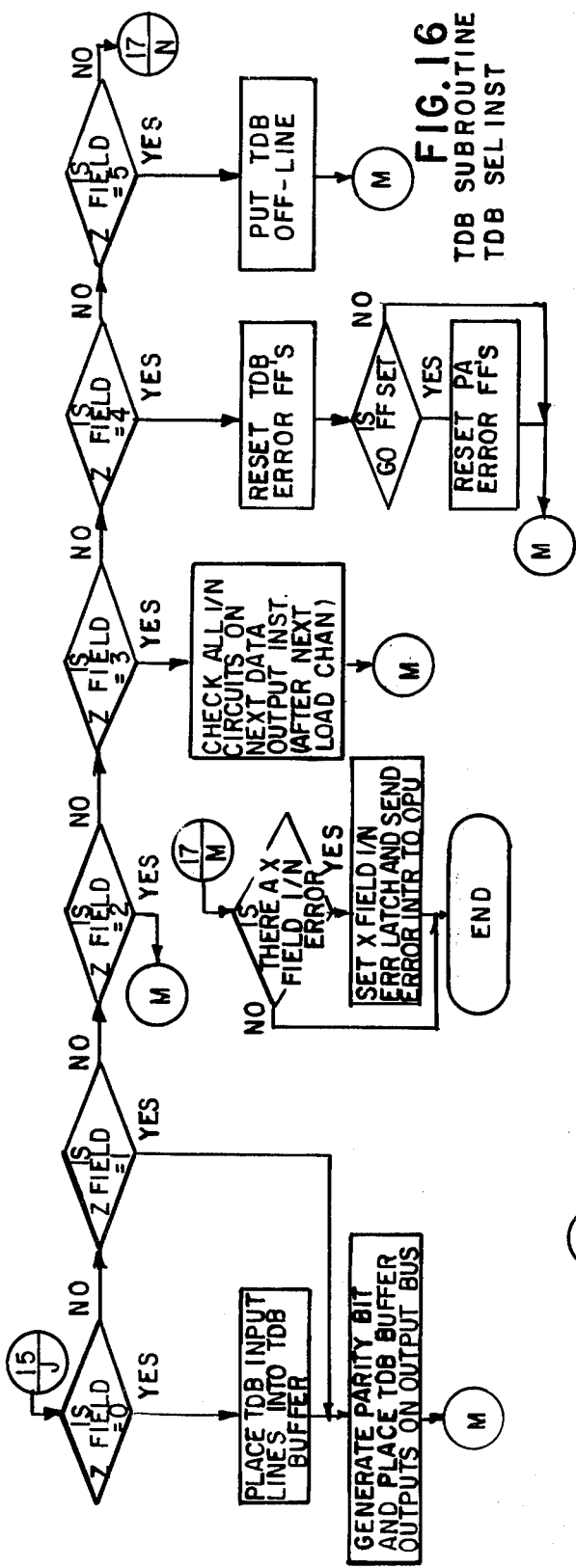
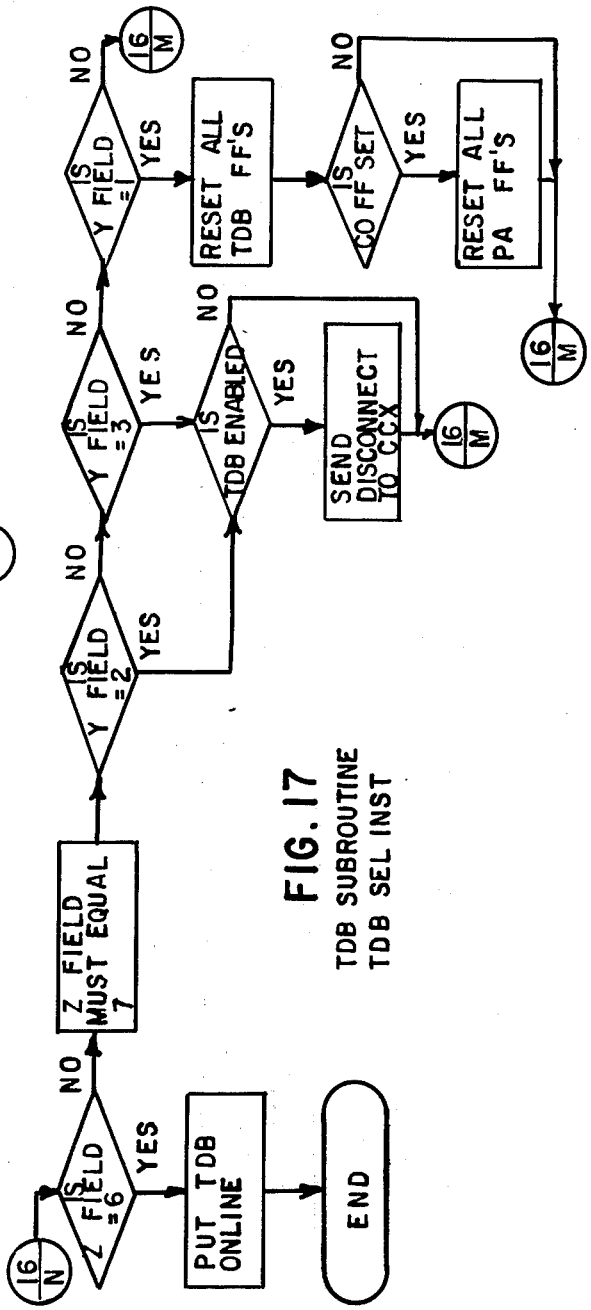
FIG. 16 TDB SUBROUTINE TDB SEL INST
FIG. 17 TDB SUBROUTINE TDB SEL INST

AUTOMATIC TOLL TICKETING
SCANNER CONTROL & TIMING
TIMER SEQUENCE

SCANNER TIMING OPERATION
NORMAL SCAN OPERATION

FIG. 20
1. ERROR STATUS ENABLE      DIRECTIVE 0 (IA)
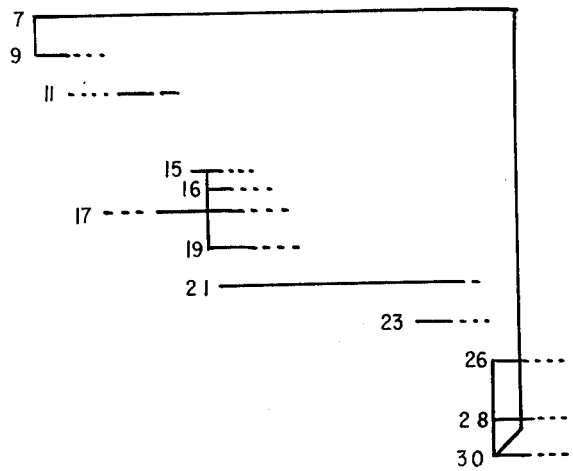
FIG. 21
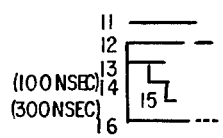
2. MAINTENANCE SCAN      DIRECTIVE 2 (IA)
   TIMING IS AS SHOWN
   FOR NORMAL SCAN
3. DATA IN LOOP CHECK      DIRECTIVE 1 (IA)
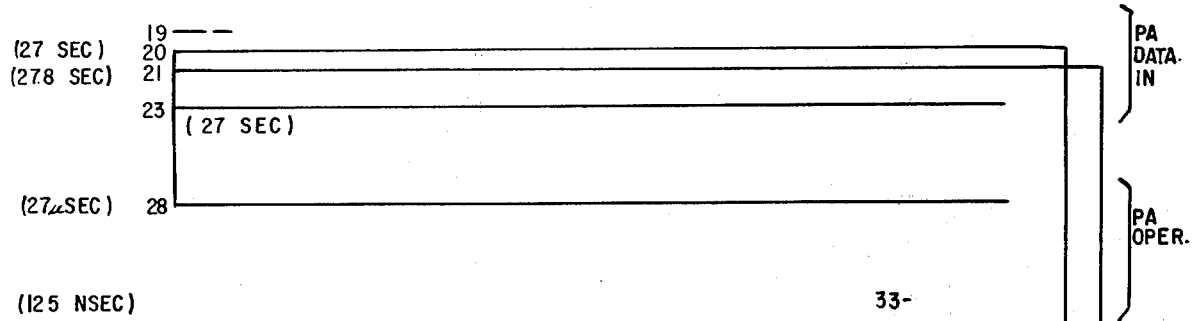
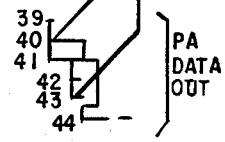

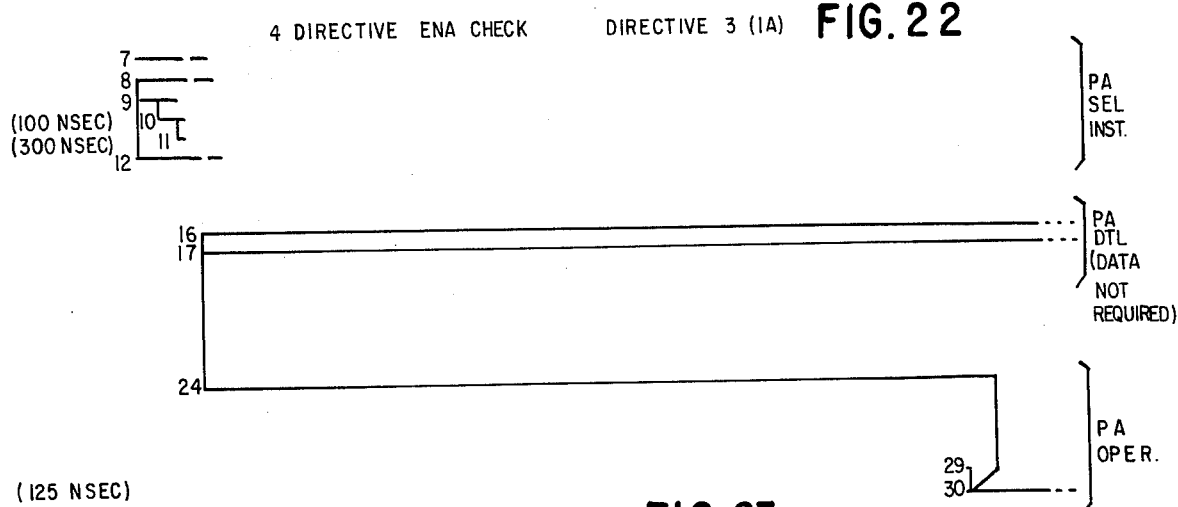
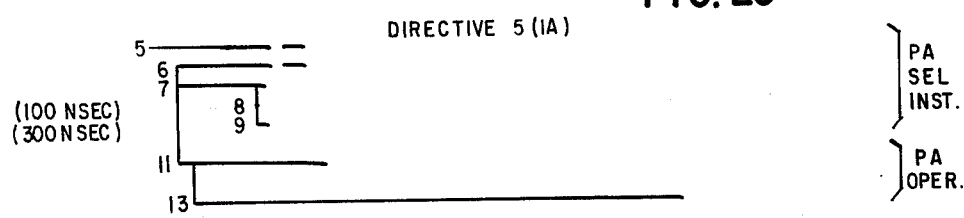
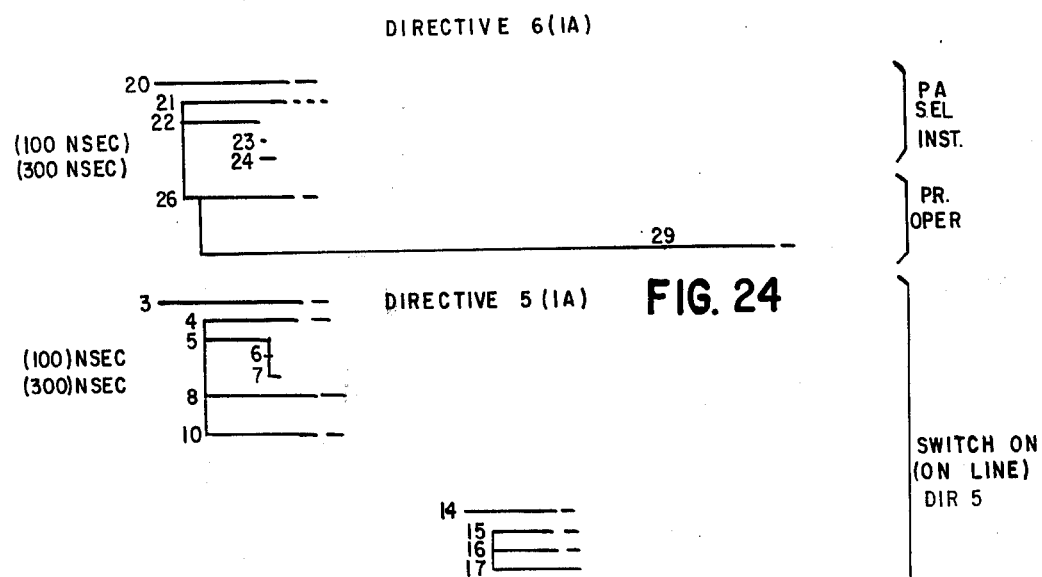
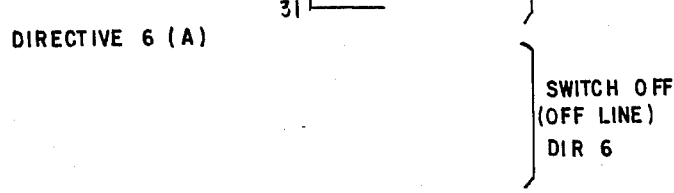

ADDRESSABLE TICKETING SCANNER

BACKGROUND OF THE INVENTION

1. Field of the Invention

This invention relates to automatic toll ticketing subsystems for use in communication switching systems, and more particularly, to an addressable scanner for monitoring usage times for originating junctors and trunk circuits of a communication switching system.

2. Description of the Prior Art.

Communication switching systems, such as telephone switching systems, generally employ toll ticketing subsystems for the purpose of billing customers for usage of telephone facilities. The essential functions of the toll ticketing subsystem are to collect, format, and record toll utilization data for future processing. The data gathered and reported is used for customer billing, toll separation, traffic engineering studies, planning and evaluation of toll services, and maintenance of toll facilities.

Automatic toll ticketing equipment may be employed to handle message rate service local traffic MRS and direct distance dialed toll traffic DDD, for example. Customers who subscribe to message rate service are allowed to place a limited number of calls of unlimited duration to points within a predefined geographic zone. For calls of this type, the ticketing subsystem monitors the status of originating junctors or incoming PABX trunks. When an answer condition is detected, the call is pegged as a completed call.

The ticketing subsystem may also collect customer billing data for direct distance dialed toll traffic. All direct distance dialed calls are ticketed as timed calls by monitoring the status of outgoing trunk circuits for both answer and disconnect times, so that the total conversation time can be determined at an accounting center.

The originating junctors and trunk circuits include supervisory hold and answer relays which in turn operate slave relays the contacts of which provide scan points which permit monitoring of the completed call for message rate service and an indication of answer and disconnect times for direct distance dialed calls. The toll ticketing subsystem includes a scanner which serves to scan the condition of the scan points.

Certain known toll ticketing systems employ scanning devices of the rotary type where scanning of a plurality of scan points is initiated at one of the scan points and the remaining scan points are scanned sequentially until end of scan is reached, at which point the scanner resets to the start position. Thus, in such systems, it is necessary to scan all of the scan points even though only certain ones of the scan points are associated with busy trunk circuits or originating junctor circuits. The scanner provides output data indicative of the condition of all of the scan points and thus the busy conditions for all of the trunk circuits and originating junctor circuits.

In common control systems, the automatic toll ticketing equipment may be controlled by the common control equipment to initiate the scanning of the scan points and the data provided as a result of such scan is returned to the common control equipment. However, since the known systems it is common to scan all of the scan points, the common control apparatus must allot time to the automatic toll ticketing equipment to initiate scanning and to recover and process the data resulting from the scan. In telephone switching systems which include a large number of originating junctors and trunk circuits, the need to scan all of the originating junctors and trunk circuits results in appreciable time loss for the common control apparatus.

Accordingly, it would be desirable to have an automatic toll ticketing apparatus which is controllable by common control apparatus in a communication switching system, which has the capability of scanning a particular group of scan points which is known to include at least one scanning device associated with a busy originating junctor or trunk circuit.

SUMMARY OF THE INVENTION

Therefore, it is an object of the present invention to provide an automatic toll ticketing arrangement including an addressable scanner means which is controllable by common control apparatus in a communication switching system to effect the interrogation of a preselected group of scan points which includes at least one scan point known to be associated with a busy path established through a switching network of the switching system.

It is a further object of the present invention to provide a toll ticketing apparatus including an addressable scanning unit having self-checking circuits for detecting fault conditions in the scanning unit and for generating an error indication for transmission to a common control unit which controls the addressable scanner unit.

These and other objects are achieved by the present invention which has provided a toll ticketing arrangement including an addressable scanner unit for use in a common control communication switching system. The addressable scanner unit includes an array of scan point devices arranged in groups in a matrix between input and output lines of the matrix to permit selective access of each group of the scan point devices. Matrix access circuits include a plurality of current sources each connected to a different input line and a plurality of current sinks, each connected to a different output line.

The status of the scan point devices of a given group is interrogated in response to data supplied to the scanner unit from common control apparatus of the switching system, which effect enabling of the current source and the current sink associated with the group of scan point devices. The data includes address data which designates the current source and the current sink and an instruction that a scan operation is to be performed. The scanner unit includes a data in register means which receives the data, address decoder means responsive to the address data to provide enabling signals for the current source and current sink, and control and timing means responsive to the instruction data to generate signals for controlling the sequencing of the scanner unit.

When an addressed group of scan point devices is interrogated, a data word is generated with each bit of the data work representing the status of a different scan point device of the selected group. The data work is then transmitted to the common control apparatus under the control of instructions provided by the common control apparatus and signals provided by the control and timing means of the scanner unit.

The scanner unit also includes eror detection means which determines that only one instruction has been received from the common control apparatus at a given time, that all the required control signals have been generated for a given operation, and that at least one but only one current source and current sink have been enabled for a given scan operation. The error detection means includes means responsive to an error condition for generating an error indication for transmission to the common control apparatus and for inhibiting further operation of the scanner unit until the source of the error has been determined.

CROSS-REFERENCES TO RELATED APPLICATIONS AND PATENTS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 342,323, filed Mar. 19, 1973, now abandoned and a continuation-in-part thereof filed which is now U.S. Pat. No. 3,835,260 issued Sept. 10, 1974, hereinafter referred to as the SYSTEM application. The system may also be referred to as No. 1 EAX ro simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent. The register-sender subsystem is described in U.S. Pat. No. 3,737,873 issued June 5, 1973 by S. E. Puccini for a DATA PROCESSOR WITH CYCLIC SEQUENTIAL ACCESS TO MULTIPLEXED LOGIC AND MEMORY, hereinafter referred to as the REGISTER-SENDER patent.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent application Ser. No. 281,586 filed Aug. 17, 1972, now U.S. Pat. No. 3,806,659 issued Apr. 23, 1974 by J. W. Eddy for an INTERLOCK ARRANGEMENT FOR A COMMUNICATION SWITCHING SYSTEM, Ser. No. 311,606 filed Dec. 4, 1972, now U.S. Pat. No. 3,830,983 issued Aug. 20, 1974 by J. W. Eddy and S. E. Puccini for a COMMUNICATION SYSTEM CONTROL TRANSFER ARRANGEMENT, Ser. No. 303,157 filed November 2, 1972, now U.S. Pat. No. 3,809,822 issued May 7, 1974, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973, now Pat. No. 3,814, issued June 4, 1974, by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966, filed Apr. 4, 1973, now U.S. Pat. No. 3,831,151 issued Aug. 20, 1974, by L. V. Jones and P. A. Zelinski for a SENSE LINE PROCESSOR WITH PRIORITY INTERRUPT ARRANGEMENT FOR DATA PROCESSING SYSTEMS.

Programs for communication between the data processing unit and the register-sender, in addition to the SYSTEM application, are disclosed in U.S. patent application Ser. No. 358,753 filed May 9, 1973, now U.S. Pat. No. 3,819,865 issued June 25, 1974, by F. A. Weber et al.

The scanner is described in two articles in the *GTE Automatic Electric Technical Journal, Vol.* 13, No. 4, (October, 1972) at pages 177–184 and pages 185–196.

The above patents, patent applications, and articles are incorporated herein and made a part hereof as though fully set forth.

DESCRIPTION OF THE DRAWINGS

FIGS. 8–17 are hardware flowcharts illustrating various operating modes for circuits of the ticketing scanner unit shown in FIGS. 5 and 5A; and, FIGS. 18–24 are timing diagrams illustrating the relationships of control and timing signals of the ticketing scanner unit.

DESCRIPTION OF A PREFERRED EMBODIMENT

General Description

Figure 1:
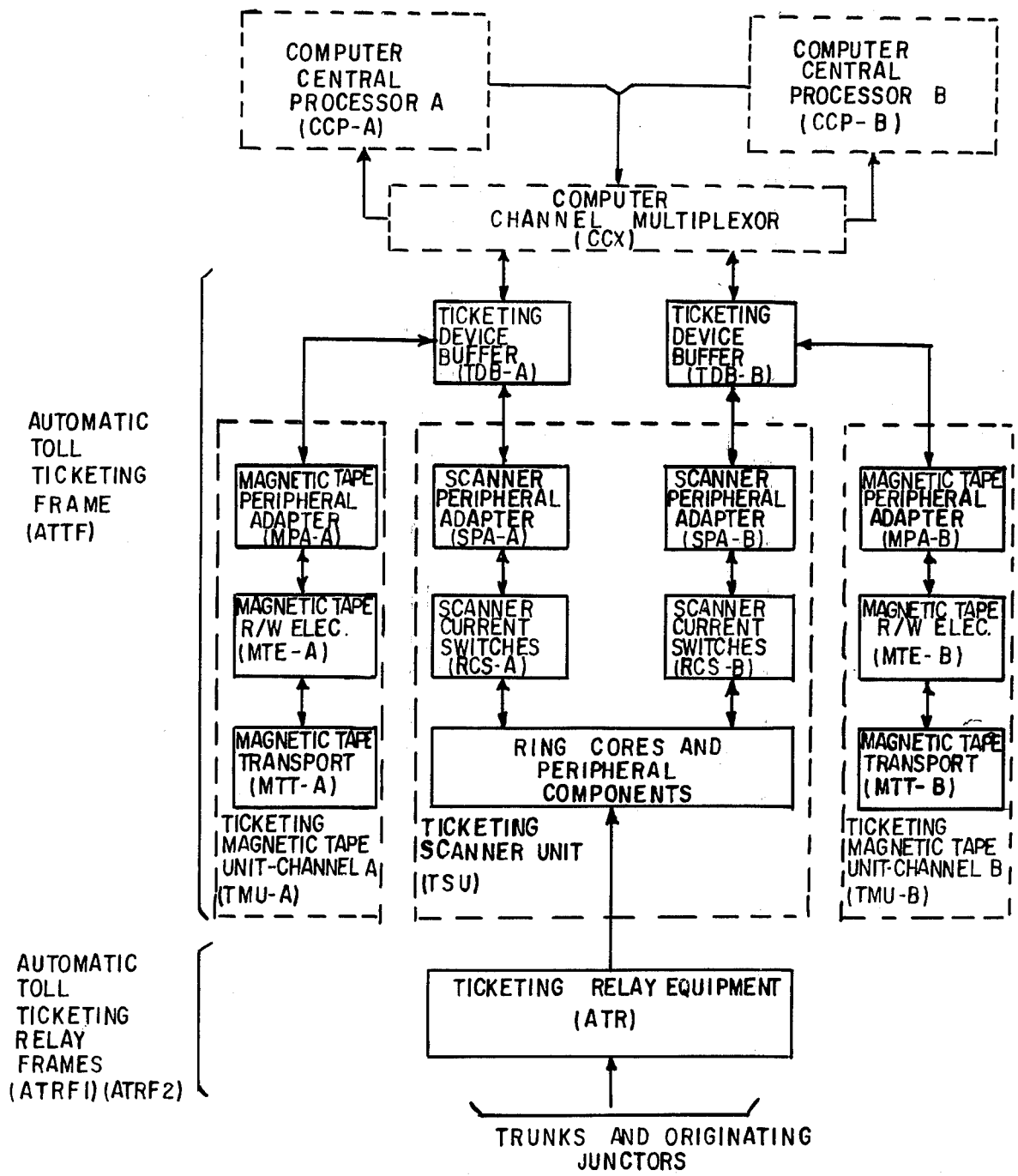
FIG. 1 is a block diagram of the ticketing subsystem including the ticketing scanner unit provided by the present invention.
Figure 2:
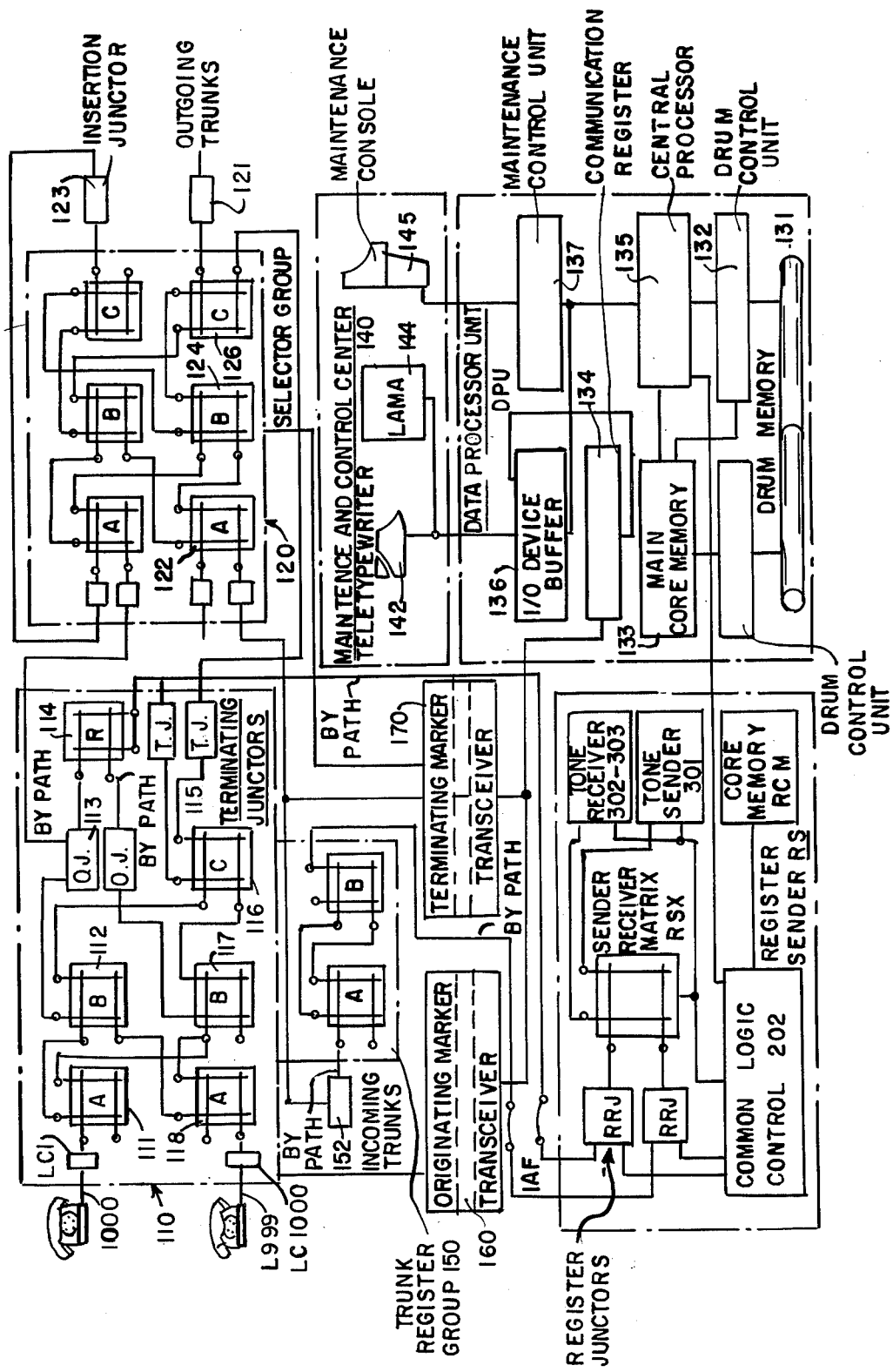
FIG. 2 is a block diagram of a communication switching system which employs the ticketing subsystem shown in FIG. 1.

Referring to FIG. 1, there is shown a block diagram of a local automatic message accounting LAMA ticketing subsystem 145, provided by the present invention. The ticketing equipment is intended for operation in a Class 5 telephone switching office, which includes a common control electronic switching system, for local automatic message accounting.

The essential functions of the toll ticketing subsystem 145 are to collect, format, and record toll utilization data for future processing. The automatic toll ticketing subsystem 145 comprises a ticketing scanner unit TSU which monitors the status of trunks and originating junctors over ticketing relay frame ATRF to provide data for use in customer billing, toll separation, traffic engineering studies, planning and evaluation of toll services, and maintenance of toll facilities. The system 145 also includes ticketing magnetic tape units TMU which serve as a recording medium for data provided by the scanner unit TSU. The ticketing scanner unit TSU and the ticketing magnetic tape unit TMU are controlled by common control apparatus of the system and communicate with a computer central processor CCP of the system via a communication channel multiplex CCX and ticketing device buffer TDB. As will be shown hereinafter, the LAMA system 145 makes maximum use of the computer central processor CCP of the common control apparatus as well as relevant information accumulated or generated by other subsystems of the communication switching system in performing the ticketing operations. One example of a telephone switching system which may employ the LAMA system 145 is now described.

GENERAL SYSTEM DESCRIPTION

The telephone switching system is shown in FIG. 1A. The system is disclosed in said system patent application, and also in said REGISTER-SENDER MEMORY CONTROL patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as the group RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 170 control the switching networks of the selector group 120 for establishing connections therethrough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170 via input/output device buffers 136, which, together with a maintenance control unit 137, transfer information to the central processor 137 from the communication register 134 and from the maintenance control center 140. The maintenance and control center 140 includes a teletypewritten 142 for communicating with the system, and a local automatic message accounting subsystem 145 for providing ticketing functions and program loading and dumping operations. A maintenance control 145 is used for maintaining the system.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. Ther terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line unit cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle paths in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

LOCAL AUTOMATIC MESSAGE ACCOUNTING SUB-SYSTEM

Equipment Capabilities

The toll ticketing equipment is intended for operation in a class 5 office for local automatic message accounting LAMA. The ticketing equipment tickets only customer-dialed automatic number identification ANI traffic. This customer-dialed ANI traffic may be either direct distance dialed DDD toll traffic or message rate service MRS local traffic. Extended direct distance dialed EDDD traffic is routed to a traffic service position system TSPS or a centralized automatic message accounting system CAMA, and is not processed by the LAMA toll ticketing subsystem. The LAMA ticketer tickets only calls originating within the local office. All DDD calls are ticketed on the outgoing trunk. All MRS calls are ticketed on originating junctors or incoming trunks serving high usage lines, such as PABX lines.

DDD Traffic

Direct distance dialing DDD traffic is ticketed as a timed call. The toll ticketing equipment supervises the call for both answer and disconnect times so that total conversation time can eventually be determined. The final determination of total conversation time is done at the accounting center. DDD traffic is restricted to station-to-station sent paid SSPD calls and to multi-message unit MMU calls. As SSPD call is a non-coin station pair call to a point outside of the customer's "expanded local area calling service" ELACS plan. A MMU call is a non-coin station paid call to a point outside of the customer's flat rate "normal area" zone, but within the boundaries of his ELACS plan.

MRS Traffic

Message rate service traffic is ticketed as pegged calls. The toll ticketing equipment supervises the call for the answer state only. That is, information is collected only as required to determine that a completed call took place and not to determine the total conversation time.

Permanent Trunk Fault Detection

The toll ticketing equipment is capable of detecting permanent trunk fault conditions of the type which:
  a. prevent the trunk from returning answer supervision to the ticketer (permanent unanswered state), or
  b. prevent the trunk from removing answer supervision to the ticketer (permanent answer state).

Office Administration Data

In addition to the recording of call data for billing purposes, the toll ticketing equipment also is capable of recording call data for certain preselected office administration functions, including traffic sampling studies, traffic service observation studies, and maintenance information. The data recorded for office administration purposes may differ in content, or may require different interpretation than the data recorded for billing purposes.

Traffic sampling refers to the constant supervision of certain types of calls such that a preselected percentage of these calls are ticketed. The purpose of traffic sampling normally is to collect data for division of revenue studies. The toll ticketing equipment provides for traffic sampling of the following:
  a. 100 percent of all completed outgoing INWATS calls,
  b. 20 percent of all completed outgoing switch service network SSN calls, and
  c. 10 percent of all completed outgoing flat rate WATS calls.

Traffic observation is the temporary supervision of certain trunk groups to determine, during specified intervals of time, the usage of these trunks. The instruction to initiate a selected traffic service observation enters into the system via the office administration teletypewriter. The ticketing operation continues until a subsequent input instruction, via the teletypewriter, terminates the study. When a trunk group is marked for study, all calls via that trunk group are ticketed completed and non-completed, billed and non-billed. The call records of non-completed and non-billed calls are marked with a special coded information character for easy identification.

Hardware Configuration and Functional Description

The toll ticketing equipment is a hybrid subsystem consisting of hardware physical equipment and software programs. This section describes the hardware. FIG. 1 shows the major hardware units associated with the toll ticketing subsystem. The toll ticketing subsystem consists of two basic equipment units called the automatic toll ticketing frame ATTF and the automatic toll ticketing relay frame ATRF. A subsystem configuration consists of one ATTF and either one or two ATRF's.

Automatic Toll Ticketing Relay Frame ATRF

The ATRF is a single-frame unit containing the scan point devices monitored by the ticketing scanner. A scan point device consists of a 1A correed. The coil of the correed is wired to the incoming trunk or originating junctor being monitored. The contact of the correed is monitored by the scanner. The ATRF serves 2,880 scan points. A fully expanded LAMA subsystem includes two ATRF's, or 5,760 scan points. Each ticketed outgoing trunk requires two scan points. All DDD calls are ticketed on outgoing trunks. Each metered originating junctor or incoming trunk requires one scan point. All MRS calls are metered on originating junctors and incoming trunks.

Each ATRF consists of four equipment files. Each file contains 720 scan points (18 cards per file, 40 scan points per card). These 720 scan points can serve either 720 originating junctors or incoming trunks MRS scan points or 360 outgoing trunks DDD scanpoints. All scan points within a single file must be dedicated to either MRS or DDD service.

Automatic Toll Ticketing Frame ATTF

The automatic toll ticketing frame ATTF is a dual frame unit containing two magnetic tape units TMU-A, TMU-B and a duel channel ticketing scanner unit TSU which communicate with the computer central processor CCP via a pair of ticketing device buffers TDB-A, TDB-B and the computer channel multiplexor CCX. The magnetic tape units TMU include a magnetic tape transport MTT, associated read/write circuits MTE and a peripheral adapter MPA. The ticketing scanner unit TSU includes a ring core matrix COR and associated peripheral components, duplicated scanner current switches RCS and peripheral adapter SPA.

The ticketing magnetic tape unit TMU and ticketing scanner unit TSU connect to the central processor CCP via the computer channel multiplex CCX. Two channels A and B are provided for reliability, each channel consisting of a scanner unit TSU and a magnetic tape unit MTU which share a common interface to the channel multiplex CCX in the form of the ticketing device buffers TDB. Ticketing device buffer TDB-A is dedicated to tape magnetic unit TMU-A and ticketing scanner unit TSU-A and comprise channel A. Ticketing device buffer TDB is dedicated to ticketing magnetic unit TMU-B and ticketing scanner unit TSU-B and forms channel B.

At any point in time, only one of the units TMU or TSU of a given channel is active. The unit TMU, TSU of the other channel is in a standby mode.

More specifically, in normal operation, both buffers TDB-A and TDB-B are active. One channel is dedicated to the corresponding ticketing scanner unit such as unit TSU-A with the associated ticketing magnetic tape unit TMU-A in standby while the other channel is dedicated to its associated ticketing magnetic unit TMU-B while the associated ticketing scanner unit TSU-B is in standby. If a fault is detected in the active channel, the system reconfigures under program control to the standby channel. Reconfiguration is manually initiated to facilitate the removal of a completed magnetic tape and the loading of a new reel of tape. This procedure also has the advantage of alternately exercising the TMU/TSU channels.

If a fault should occur in one of the channels, the entire ticketing operation can be handled by the other channel, freeing the faulty channel for maintenance. Hardware errors are detected during operation by means of parity and one-out-of-N checking circuits. A read-after-write check is provided for the magnetic tape to insure the validity of the final data record. In the event of an error, a particular task is repeated to account for the possibility of transients. If an error occurs during the second attempt, the system reconfigures to single-channel operation and places the faulty unit out of service.

Ticketing Scanner Unit TSU

The ticketing scanner unit TSU is a medium speed electronic scanner/multiplex device. Its function is to monitor the scan point switches located in the frame ATRF, whose purpose is to duplicate the call processing state of the trunks and originating junctors. The unit TSU functions under address control by the computer central processor CCP. Each scan address retrieves the status of 24 scan points. Up to 120 scan addresses can be applied to a theoretical maximum of 1,440 ticketed outgoing trunks. The remaining 120 scan addresses can be applied to MRS metering. This allows for a theoretical maximum of 2,880 originating junctors and incoming trunks. In addition, eighty addresses are available for routining and fault localization.

Figure 4:
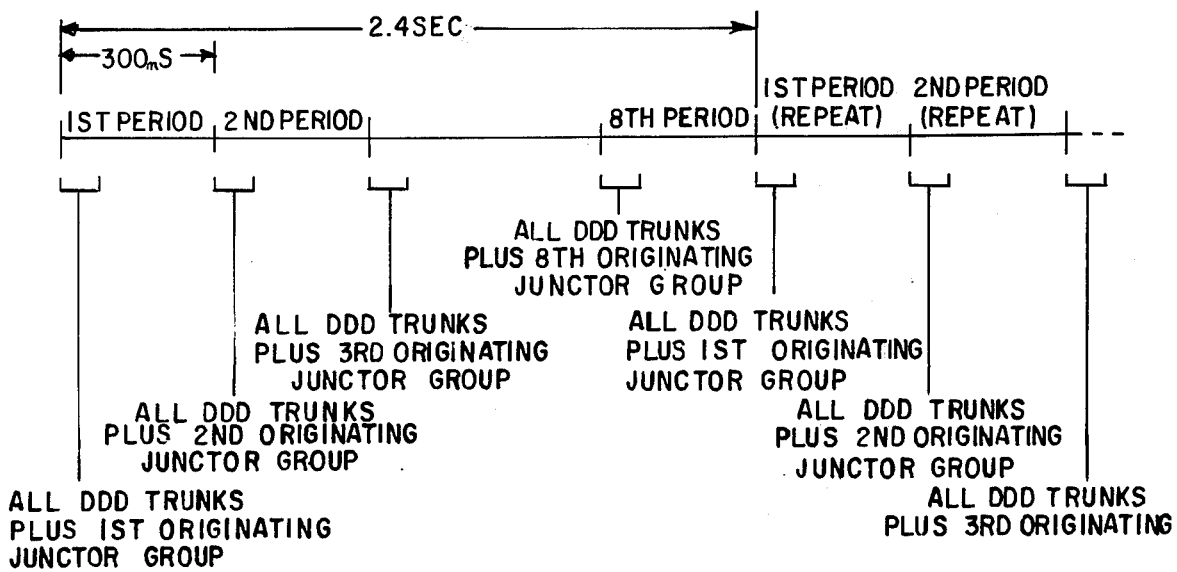
FIG. 4 shows the scan sequence for the ticketing scanner unit of FIG. 1.

FIG. 4 shows the scan sequence for the unit TSU. All DDD ticketed points are scanned at 300 millisecond intervals and all MRS metered points are scanned every 2.4 seconds.

For ticketed DDD calls, the unit TSU monitors two normally open contacts H and A associated with each outgoing trunk circuit that is accessible by DDD traffic. When both the hold contact H and the answer contact A are open, the trunk is in the idle state. When contact H is closed and contact A is open, the trunk is seized but not answered. When answer supervision is returned, both contacts H and A are closed. These conditions are shown in Table I.

Table I

Hold and Answer Contact Configuration.

| TRUNK STATE | CONTACT | |
|---|---|---|
| | H (Hold) | A (Answer) |
| Trunk Idle | 0 | 0 |
| Trunk Seized | 1 | 0 |
| Trunk Received Answer Supervision | 1 | 1 |
| Calling Party Goes On-Hook (Invalid State) | 0 | 1 |

With one scan address, the unit TSU scans all A contacts of a group of 24 trunks. On the succeeding address, the H contacts of the same group of trunks are scanned.

It takes a nominal 27 microseconds to execute one scan address. Hence, it takes 54 microseconds nominal to scan a trunk group consisting of 24 DDD trunks.

For a metered MRS call, the unit TSU monitors a single normally open contact associated with each MRS originating junctor or incoming trunk. During the monitoring interval which starts at the time of cut-through, a closed contact represents the return of answer supervision from the called party. With each scan address, 24 MRS circuits are monitored, representing a scan rate of 24 points per 27 microseconds.

Ticketing Magnetic Tape Unit TMU

The ticketing magnetic tape unit TMU is more fully disclosed in the MAGNETIC TAPE UNIT application. The ticketing magnetic tape unit consists of the magnetic tape transport and its associated read/write electronics, data buffering, error detection, and tape drive control electronics. The transport used is a Cook Electric Series 3300 modified digital magnetic tape transport. The transport write/read head assembly writes data on nine tracks in a continuous NRZI non return to zero — IBM mode at 800 characters per inch. The tape used is standard width half-inch computer tape.

Ticketing data is written in blocks of 15 calls/ block. Total time required to write a block of 15 calls is nominally 353 milliseconds. A read after write check for vertical and longitudinal parity is performed on each block. If an error is detected, the tape is advanced 3.75 inches and the block is re-written.

Call data is written in the "single entry" format; i.e., all the data pertaining to an individual call is formatted together in one single entry on the tape. The data transfer rate is 4,000 tape characters per second using the EBCDIC extended binary coded decimal interchange code magnetic tape code.

Ticketing Device Buffer TDB

The ticketing device buffer provides the I/O interface to the computer complex. All subsystem interrupts and all data and instructions are routed via the buffer TDB, there being only one error interrupt and one ready interrupt associated with the buffer TDB. The buffer TDB data channel consists of 24 bits plus parity, the parity being checked or generated according to direction of transmission. One of N checking is performed on select instructions and certain interface leads of the peripheral adapter. There is a full word of status bits accessible by a select instruction. The buffer TDB is equipped in duplicate, each unit serving one scanner and one magnetic tap channel. In normal active operation, one buffer TDB is used to service the I/O operation to the scanner and the other buffer TDB services the magnetic tape unit. The role is switched on alternate days. Under a fault condition, one buffer TDB could service both a scanner and a magnetic tape unit sequentially, with the magnetic tape unit having the highest priority.

Software Description

Figure 3:
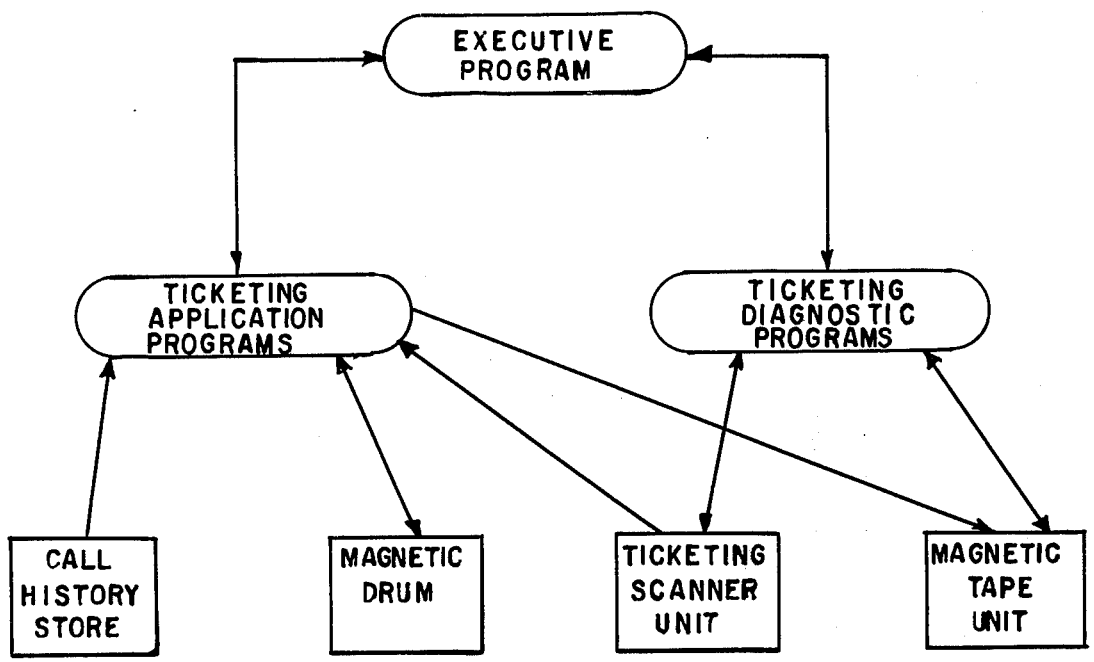
FIG. 3 shows the functional relationship between the ticketing scanner unit and the switching system.

The ticketing function for the system is performed through the use of the ticketing hardware, including the ticketing scanner unit TSU, the magnetic tape unit MTU and the automatic toll ticketing relay frame ATRF. Referring to FIG. 3, there is shown a diagrammatic representation of the relationship between the ticketing subsystem 145 and the common control switching system.

The Executive Program controls the complete system, it provides the overall control for the ticketing subsystem 145 and integrates the ticketing system into the rest of the system.

The Ticketing Application Programs control the collection of data from the call history store and the ticketing scanner, provide interpretation where necessary, and access the intermediate storage. They also format the data prior to outputting it to magnetic tape.

The Ticketing Diagnostic Programs are used to routinely exercise the scanner and tape units and to localize faults to an acceptable subsection of the hardware. They also serve to verify that faults have been repaired correctly.

The Call History Store is used to save data associated with a call by the system during the setting up of a call and is released following cut-through. It provides the ticketing subsystem with the calling and called directory numbers and other relevant billing information.

The Magnetic Drum provides slow access and backup storage for the system: it is used by the ticketing sub-system for intermediate storage, to accumulate complete call records in a single-entry form. Each ticketing trunk uses a six-word cell and each ticketing originating junctor or incoming trunk uses a two-word cell.

The Ticketing Scanner Unit monitors the state of the answer contacts for originating junctors and incoming trunks, and the state of the answer and hold contacts for outgoing trunks. The answer contact is associated with the called subscriber and the hold contact is associated with the calling subscriber.

The Magnetic Tape Unit records the ticketing data in blocks of fifteen calls and provides IBM compatibility: It uses a transfer rate of 4,000 characters per second and stores 1,000 call records on nine feet of tape.

The ticketing software comprises the ticketing application programs and the ticketing diagnostic programs. The ticketing application programs, which are disclosed in the application Ser. No. 432,803, now abandoned, of L. Lattanzi, G. Grzybowski, and P. Harrington, are the operational programs that control the ticketing hardware and produce the necessary data for the correct billing of the customers. The ticketing maintenance programs, which are disclosed in the application 434,723, now abandoned of D. Gaon exercise the unit TSU, separately or in conjunction with a peripheral unit, the frame ATRF, and verify the correct operation of the ticketing apparatus. The maintenance program localizes faults in the scanner unit TSU or frame ATRF to a reasonable number of least replaceable units.

The major software application and diagnostic program modules associated with the toll ticketing subsystem 145 are described below.

In the seizure module T$\phi$1, the seizure routine is associated with the initial seizure of a ticketed trunk or originating junctor message rate service call. When the seizure routine receives an indication from the call processing program that a particular trunk or junctor is seized for the processing of a new call, the seizure routine checks to determine whether the previous call using that trunk or junctor has been completed. The seizure routine is responsible for detecting incomplete calls and assuring that the trunk or originating junctor is not scanned by the ticketing scanner unit until it has been determined that the new call is to be ticketed.

The basic function of the call completion modules T$\phi$2 is to indicate that the trunk or originating junctor is to be scanned by the ticketing scanner unit. Information pertaining to the call is collected from the call history table, formatted, and written into a dedicated drum memory cell associated with the ticketed circuit.

The scan interrupt module T$\phi$3 detects and records answer and disconnect times for calls. The scan interrupt routine is associated with the normal cycle of scan of all ticketed trunks and junctors. An interval timer, at 300 -millisecond intervals, interrupts the central processor to initiate a scan routine. During each scan period, the program causes the ticketing scanner unit to successively interrogate to address and retrieve data for all trunks, together with a subgroup of the originating junctors. When answer is detected, the time is stored in the drum cell with the other information related to the call. When disconnect is detected, the data is read from the drum cell into a core main memory work area and the time of disconnect is added to the record.

The output format module T$\phi$4 formats the drum cell call information for magnetic tape output.

The call record buffer format module T$\phi$5 is responsible for transferring the formatted call record data from a core memory work area to the call record buffer. The call record buffer holds a data block containing a maximum of 15 call records. When it is filled, the T$\phi$5 module indicates to the magnetic tape I/O scheduler F73 that a data block is ready to be transferred to magnetic tape. This executive subprogram module schedules the outputting of the data block by the magnetic tape unit.

The time initialization module T$\phi$6 is responsible for recording the identity of all the outgoing trunk circuits on which a call was in progress during the time change. It also formats the time change data block as required for magnetic tape output.

The time change update module T$\phi$7 updates the drum cells associated with all trunk circuits on which a conversation was in progress during a time change. The update consists of setting an indicator specifying that the call was in progress during the time change. The update operation consists of a read-modify-write sequence.

The midnights passed interrupt handler T$\phi$8 is responsible for recording the identity of all of the trunk circuits on which a conversation was in progress during a time change from one day — through midnight — to the next day.

The midnights passed update module T$\phi$9 updates the drum cells associated with all outgoing trunk circuits on which a conversation was in progress at midnight. The update consists of incrementing a counter in the cell by one if midnight occurred during a call. The update operation consists of a read-modify-write sequence.

The TTY message format module T1$\phi$ is responsible for formatting all of the information required to be outputted on the TTY. This module formats three basic types of messages:

a. Permanently closed contact identity.
b. Permanently opened contact identity.
c. Nine day duration of call.

The ticketing contact check module T11 performs basically two types of checks on the ticketing contacts (scan points): verify that the contacts are incapable of closing, and/or verify that the contacts are incapable of opening. The contact check module is scheduled at equal intervals of time, normally once per day. If it is determined that the contacts associated with a circuit trunk or originating junctor have never been opened or closed depending upon the check during the predetermined interval of time, a TTY message is initiated. This message contains the identity of the contacts that are faulty.

The scanner double fault, module T12 is scheduled whenever a double fault condition is detected in the TSU by the I/O handler module F72, indicating that both scanners are not working properly. T12 performs the necessary processing required to assure that no customers are improperly charged for calls due to this TSU malfunction.

The drum error module T13 is scheduled whenever a drum read or write is requested by the ticketing software and a drum error is encountered (read or write cannot be made). This module assures that the customer will not be improperly billed due to an error of this kind.

The ticketing algorithm module T14 consists of a set of algorithms which are used to access the ticketing tables. A program module can use T14 as a closed subroutine in order to locate a specific entry in the table. All the ticketing modules T prefix except T05, T06, T08, and T10 use the ticketing algorithm module to access these tables.

The ticketing scanner I/O handler F72 controls all communication between the ticketing scanner unit and the central processor for both normal operations and maintenance routines.

The magnetic tape I/O scheduler F73 schedules the outputting of data to the ticketing magnetic tape unit.

The magnetic tape I/O handler F74 controls all communication between the ticketing magnetic tape unit and the central processor for both normal operations and maintenance routines.

The pre-scan hardware validation module W$\phi$1 is run prior to each 300-millisecond scan cycle. It essentially provides for an "abbreviated" routine of the ticketing scanner unit and the contact-diode matrix of the ATRF, to validate proper hardward operation.

The ticketing change over module W$\phi$2 controls the step-by-step procedure required to perform a correct changeover from the A channel equipment to the B channel equipment and vice versa. The routine is initiated by a TTY request, normally for the purpose of changing a reel of magnetic tape.

The TSU fault localization, repair verification, and routining module W$\phi$5 provides for the detailed routining and maintenance diagnostics of the ticketing scanner unit. It is run periodically at scheduled intervals and also when a fault is detected hardware the hardware error detectors. These programs serve to reconfigure a working subsystem under fault conditions, exercise the hardware and provide a printout of errors, check the scanning contact isolation diodes, and check for permanent answer and permanent non-answer conditions.

The TMU fault localization, repair verification, and routining module W$\phi$6 provides for the detailed routining and maintenance diagnostics of the ticketing magnetic tape unit. It is run at scheduled intervals and whenever a fault is detected by hardward error detectors.

Principal Tables

In the activity bit table, each ticketed circuit (incoming trunk or originating junctor) has an associated "activity bit". The purpose of the activity bit is to indicate to the ticketing scanner unit that it should start scanning the associated point. The activity bit is set at the time cut-through. For trunk circuits DDD calls, it is reset at the time of disconnect. For incomplete calls, it is reset at the time the trunk is re-seized for a new call.

In the previous status bit table, each ticketed trunk has an associated "previous status" bit not the originating junctors, however. A 1 in this bit position indicates that on the previous scan, the trunk was in the "true" answer state. A true answer means that the H and A contacts (refer to Table I) are both sensed as closed and this state has been maintained for a 2-second interval charge delay interval. A 0 indicates, that on the previous scan, true answer supervision was not yet detected.

The charge delay table is used to record the number of successive scans that the scanner has detected answer supervision (A and H contacts both closed) for a given trunk or originating junctor circuit. A three bit field is associated with each trunk and originating junctor. On each successive scan that answer is detected, the field is incremented by a count of one. When the field reaches a set value corresponding to the charge delay interval, a true answer condition is recorded.

The trunk disconnect recorded table contains one bit per ticketed trunk. A logic 0 in the bit position indicates that a disconnect time has not yet been recorded in the trunk call record cell on drum memory. A logic 1 in the bit position indicates that the time of disconnect is recorded in the trunk call record cell on drum memory. If the scanner detects that the called party returns on-hook (A contact restores), the time is recorded in the trunk call record cell and the associated bit is set (logic 1) in the trunk disconnect recorded table (possible disconnect). The trunk is still scanned until the calling party goes on-hook (H contact restores). In this case, the recorded disconnect time on drum is used for billing. However, if the called party returned off-hook assuming the calling party did not yet go on-hook and the conversation resumed, the bit in the trunk disconnect recorded table is reset (logic 0) and timing continues. The first recorded disconnect time is ignored and a new disconnect time is recorded when either of the parties goes on-hook.

In the open and closed contact tables, each ticketed circuit trunk or originating junctor has an associated bit position in the ticketing open contact table and a corresponding bit position in the ticketing closed contact table. These tables are used with the ticketing contact check module to determine whether a permanent fault exists that prevents the circuit from properly returning answer supervision, i.e., contacts are permanently opened or permanently closed.

a. Closed contact table: 0 indicates the contact was never detected open (always closed when scanned). 1 indicates that an open contact condition was detected at least once during the monitoring interval (normally 1 day).

b. Open contact table: 0 indicates the contact was never detected closed (always open when scanned). 1 indicates that a closed contact condition was detected at least once during the monitoring interval (normally 1 day).

The circuit status table indicates which circuits are in service and available to the ticketing software for handling calls.

The trunk call record table located on drum memory, consists of several individual trunk call record cells one for each ticketed DDD call. Each cell consists of six words of memory and provides for temporary storage throughout the duration of the call of the calling and called number, answer time, and other call related information.

The originating junctor call record table, located on drum memory, consists of several individual originating junctor call record cells one for each metered MRS call. Each cell consists of two words of memory and provides for temporary storage of the calling number and other call related information.

The circuit equipped table is used to specify whether a particular originating junctor or trunk circuit in the office section is equipped (the ticketing contacts are connected and the circuit "exists").

Information Flow and Control

The paragraphs that follow present a brief description of the information flow associated with a DDD call. The presentation is somewhat over-simplified, to facilitate a basic understanding of the programs utilized during a DDD call.

Assume that a DDD call has to be ticketed. The system call processing program determines the identity of the trunk that was seized. At this point, the call processing program stores the identity of the seized trunk for this call, and transfers control to the ticketing seizure module.

The seizure module checks the activity bit table to assure that the associated trunk activity bit is set false. This inhibits the scanner from looking at the trunk supervisory contacts during outpulsing. Control is then returned to the call processing program.

If the last call on this trunk was incomplete, the activity bit is still true when checked by the seizure module. In this case, the seizure module resets the activity bit false and schedules the recording of the "incomplete call" information on magnetic tape if traffic observation is being conducted.

Assuming a normal call, after cut-through register-sender outpulsing completed has occured, the call processing program passes the equipment number of the trunk, the called number, and the calling number to the ticketing call completion module. The call completion module gathers this information, generates other information, and schedules the writing of this information in a table on the drum. The call completion routine then sets the activity bit true causing the scan interrupt routine to begin interrogating the trunk for an answer condition. The call completion module returns control to the call processing program.

The scan interrupt module interrogates the trunk for an answer condition until an answer condition is found.

When answer is first detected (both H and A contacts closed), the scan interrupt routine begins timing a 2-second charge delay interval. If the answer state remains for the 2-second interval, the time of answer is recorded and is scheduled to be written into the drum cell associated with this trunk.

The scan interrupt routine continues to interrogate the trunk looking for a disconnect condition. A disconnect condition is encountered when the called party disconnects and/or the calling party disconnects. If the calling party disconnects, the disconnect is defined as a "true disconnect". If only the called party disconnects, the disconnect is defined as a "false disconnect". Thus, the calling party controls the actual disconnection of the line. Let's take the case of a false disconnect. When this condition is detected A contact has restored, the disconnect time is stored on the drum and the associated trunk bit is set in the trunk disconnect recorded table. If the H contact is still operated, indicating that the calling party is still off-hook, the scanner continues monitoring the trunk. If the A contact reoperates (called party returns off-hook) before the H contact restores due to either a time-out or the calling party going on-hook, the trunk bit in the disconnect recorded table is set false. This nullifies the disconnect time previously recorded. The scanner always continues its supervision until both the H and A contacts have restored, indicating a true disconnect. After a true disconnect is encountered, a request is then generated to move the information associated with the trunk generated to move the information associated with the trunk from the drum cell to a buffer work area in the computer core main memory. The scan interrupt module also requests the scheduling of the output format module after the information has been read off of the drum. After this call has been terminated, the scan interrupt routine stops scanning the trunk.

When the output format module begins execution, it formats all of the information concerned with this DDD call. The call record buffer format module is then scheduled. This routine places the formatted information in a call record buffer. When the buffer is filled (data from fifteen calls), the call record buffer module indicates to the magnetic tape I/O scheduler module to schedule the outputting of this data on magnetic tape.

DETAILED DESCRIPTION

Figure 5:
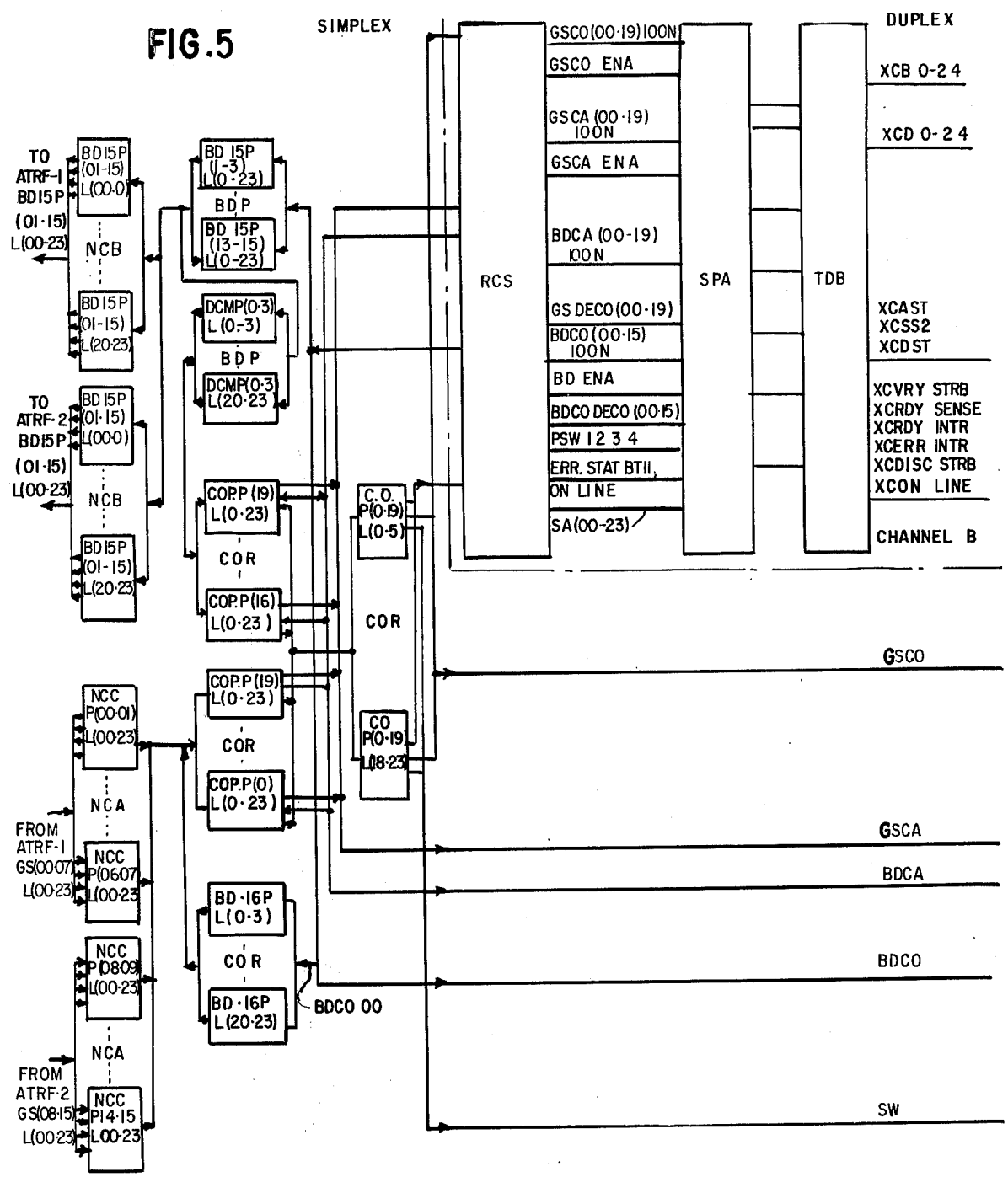
FIGS. 5 and 5A when arranged in a side by side relationship show a detailed block diagram of the ticketing scanner unit shown in FIG. 1.
Figure 5A:
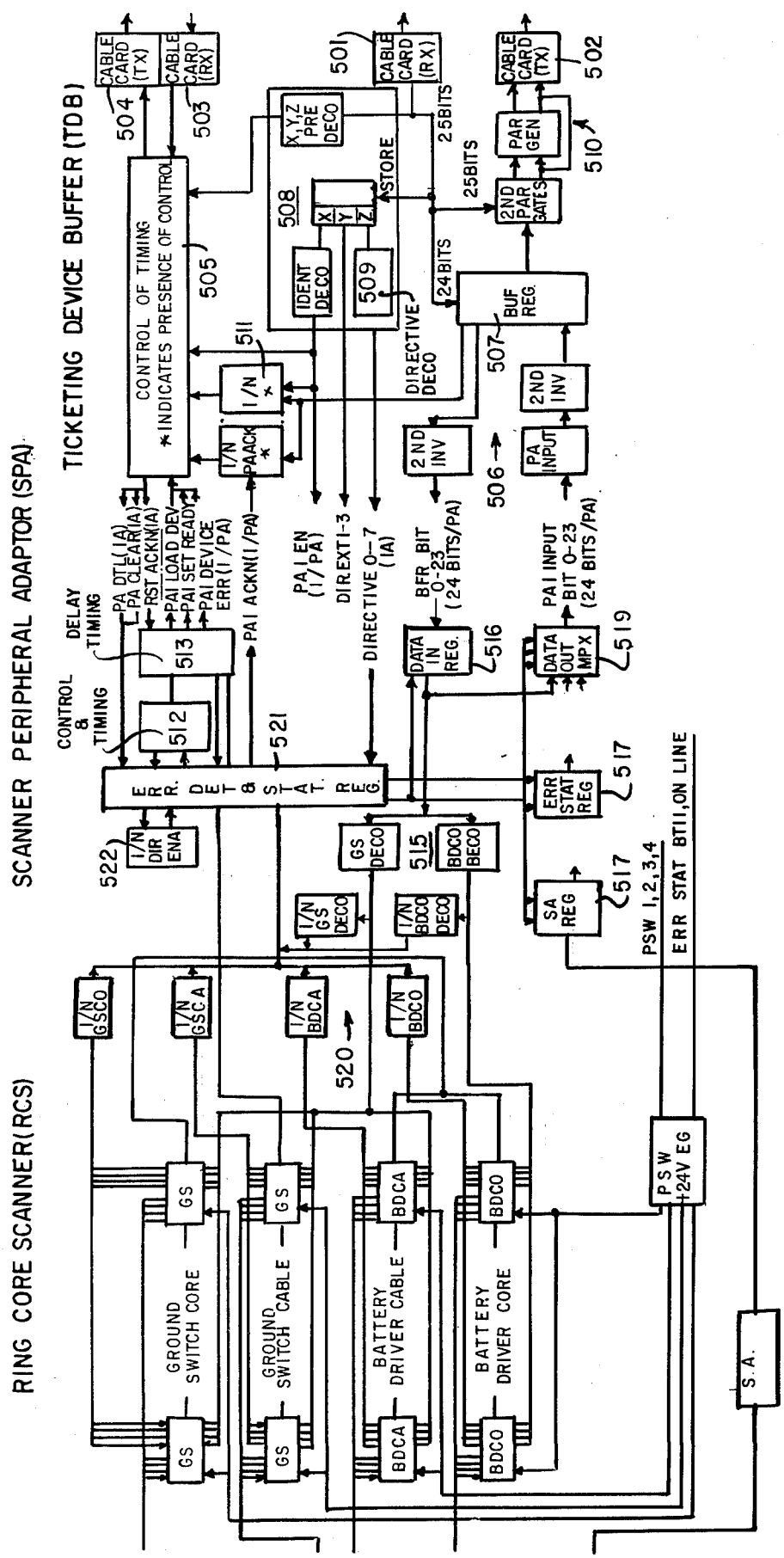

Referring to FIGS. 5 and 5A, there is shown a block diagram of the electronic control and switching circuits which comprise the ticketing device buffer TDB, the scanner peripheral adapter SPA, the ring core scanner RCS which comprise a duplex portion of the frame ATTF, and passive components, including the battery driver peripheral BDP, the core and core peripheral COR and the network cable cards NCA and NCB which comprise the simplex portion of the frame ATTF and which serve as the interface between the electronic circuitry of the frame ATTF and the electromechanical circuitry of the frame ATRF.

Ticketing Device Buffer TDB

The ticketing device buffer TDB serves as an expander between the central processor unit CPU via the computer channel multiplex CCX and the peripheral units such as the ticketing scanner unit TSU and the magnetic tape unit TMU. Each ticketing device buffer TDB can serve one of four peripheral units at a time and therefore contains circuits for the immediate reception and transmission of data and commands between the unit CPU and that peripheral unit. The buffer TDB contains decoders such that the unit CPU can converse with any particular peripheral unit, with the other circuit being in a waiting state. The buffer TDB includes self-checking circuits which determine validity and correctness of instruction and data received from and extended to the unit CPU.

For the purposes of the ticketing scanner unit TSU and in normal operation thereof, one ticketing device buffer TDB serves the scanner peripheral adapter SPA and, at the same time, the other ticketing device buffer TDB serves the magnetic tape peripheral adapter MPA.

The buffer TDB interfaces directly with the computer channel multiplex CCX via cable cards 501–504 over leads designated in FIG. 5A as follows:
24 Data In leads marked XCD0 to XCD23
1 Data In parity marked XCD24
24 Data Out leads marked SCB0 to SCB23
1 Data Out parity marked XCB24
11 Control leads marked:
  TICKET SCANNER OFF LINE
  TICKET MAG TAPE OFF LINE
  XCRDY SENSE
  XCERR INTR
  XCON LINE
  XCDISC STRB
  XCVRY STRB
  XCDST
  XCAST
  XCSS2

The buffer TDB also interfaces directly with the scanner peripheral adapter SPA via leads designated in FIG. 5A as follows:
24 Data In leads marked BFR BT0 to BFR BT23
24 Data Out leads marked PA1 INPUT BIT 0 to PA1
INPUT BIT 23
8 Directive leads marked DIRECTIVE 0 (1A) to DIRECTIVE 7 (1A)
7 Control leads marked PA DTL (1A)
  PA CLEAR (1A)
  PA 1 EN
  RST ACKN (1A)
  PA1 LOAD DEV
  PA1 SET READY
  PA1 ACKN
1 Dummy CONTROL LEAD 10 PA1 DEVICE ERR In addition, the ticketing device buffer TDB interfaces with the magnetic peripheral adapter MPA (FIG. 1) via 24 data in leads, 24 data out leads, 8 directive leads, three directive extension leads, and 10 control leads (not shown).

As indicated above, the ticketing device buffer TDB basically serves as an interface between the ticketing scanner unit TSU and the magnetic tape unit TMU and serves to extend data or control signals provided by the central processor unit to either the magnetic tape unit MTU or the scanner unit TSU in accordance with directives supplied by the central processor unit CPU. In addition, the ticketing device buffer TDB serves to return responses including data and controls provided by the ticketing scanner unit TMU and the magnetic tape unit TMU to the central processor unit CPU. Accordingly, the ticketing device buffer TDB includes a control of timing circuit 505 for processing control signals provided by the central processing unit CPU, the ticketing scanner unit TSU or the magnetic tape unit MTU, and a data register indicated generally as 506, including a buffer register 507 which permits data or addresses to be received from the central processing unit to be stored prior to sending such data or addresses to either the scanner unit TSU or tape unit MTU. The buffer register 507 also stores data provided by the scanner unit TSU and the tape unit MTU prior to transmission of such data to the central processor unit CPU.

The ticketing device buffer TDB further includes directive processing circuitry 508 which stores and decodes the directives provided by the central processing unit CPU to provide control signals for the control of timing circuit 505 as well as further control signals for the scanner peripheral adapter SPA and the magnetic tape peripheral adapter MPA. The directive processing circuit 508 also extends the directive designated for the scanner unit TSU to the scanner peripheral adapter SPA via directive decoder circuit 509 and extends directives designated for the tape unit MPU to the magnetic tape peripheral adapter MPA.

The device buffer TBA also includes parity circuits 510 which perform parity operations on the data provided by the scanner unit TSU or tape unit MTU prior to returning such data to the central processor CPU. Also, 1 out of N check circuits 511 insure that only one Directive has been received at a given time.

Scanner Peripheral Adapter SPA

The purpose of the scanner peripheral adapter SPA is to interpret instructions received from the ticketing device buffer TDB into a specific set of sequences required to perform the function indicated by control or directive signals provided by the central processing unit CPU. The scanner peripheral adapter SPA is basically comprised of SUHL logic circuits which receive and decode the instructions and data extended to the scanner peripheral adapter SPA via the ticketing device buffer TDB from the central processing unit CPU.

The data word or address received is translated into enable signals by which the status of specific groups of up to 24 network contacts are interrogated during a given scan cycle. The scanner adapter SPA includes timing and control circuits 512 513 and decoding circuits, indicated generally at 515, which control the sequential operation of the scanner unit TSU. The scanning adapter SPA also includes data registers, 516–518, which store the address data received, the scan data and the error status respectively, and a data output multiplexer 519 which enables different sets of data to be transmitted back to the central processing unit CPU via the device buffer TDB. Also circuits 520 of the scanner adapter SPA associated with the matrix access circuits of the ring core scanner RCS, insure that only one group of contacts of the scan matrix are interrogated at a time, since simultaneous reading of two or more groups could cause erroneous billing to customers.

The scanner adapter SPA checks for correct timing and validity of received instructions and all errors are registered during the operation of the scanner adapter SPA and the circuitry of the scanner adapter SPA is cleared at the end of each operation under the control of signals provided by the device buffer TDB.

The scanner adapter SPA interfaces with:
The buffer TDB, as explained above.
The scanner RCS, via 144 leads including:
16 leads marked
  BDCO DECO 00 to BDCO DECO 15
20 leads marked
  GS DECO 00 to GS DECO 19
76 leads marked
  BDCO 00 100 N to BDC015 100N
  BDCA 00 100N to BDCA 100N
  GSCA 00 100N to GSCA 19 100N
  GSCO 00 100N to GSCO 19 100N
3 leads marked
  BD ENA, GSCA ENA and GSCO ENA
24 leads marked
  SA00 to SA23
5 leads marked
  ERR STAT BT11 (ON LINE)
  and PSW1 to PSW4
the magnetic tape adapter MPA, via lead STAT BIT 0

Ring Core Scanner RCS

Figure 7:
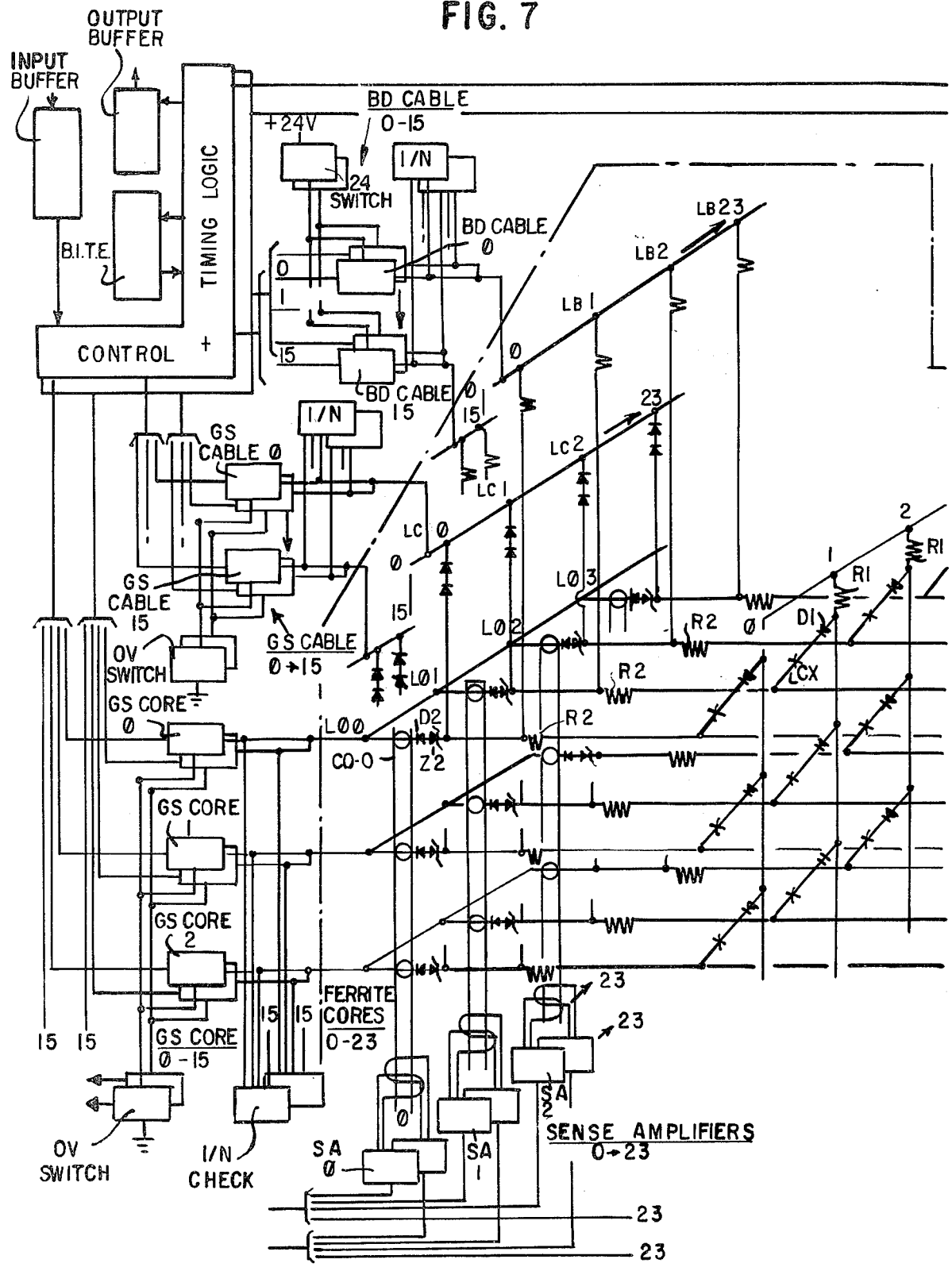
FIGS. 7 and 7A when arranged in a side by side relationship show a detailed block and partial schematic circuit diagram of the matrix of the ticketing scanner unit shown in FIG. 5.
Figure 7A:
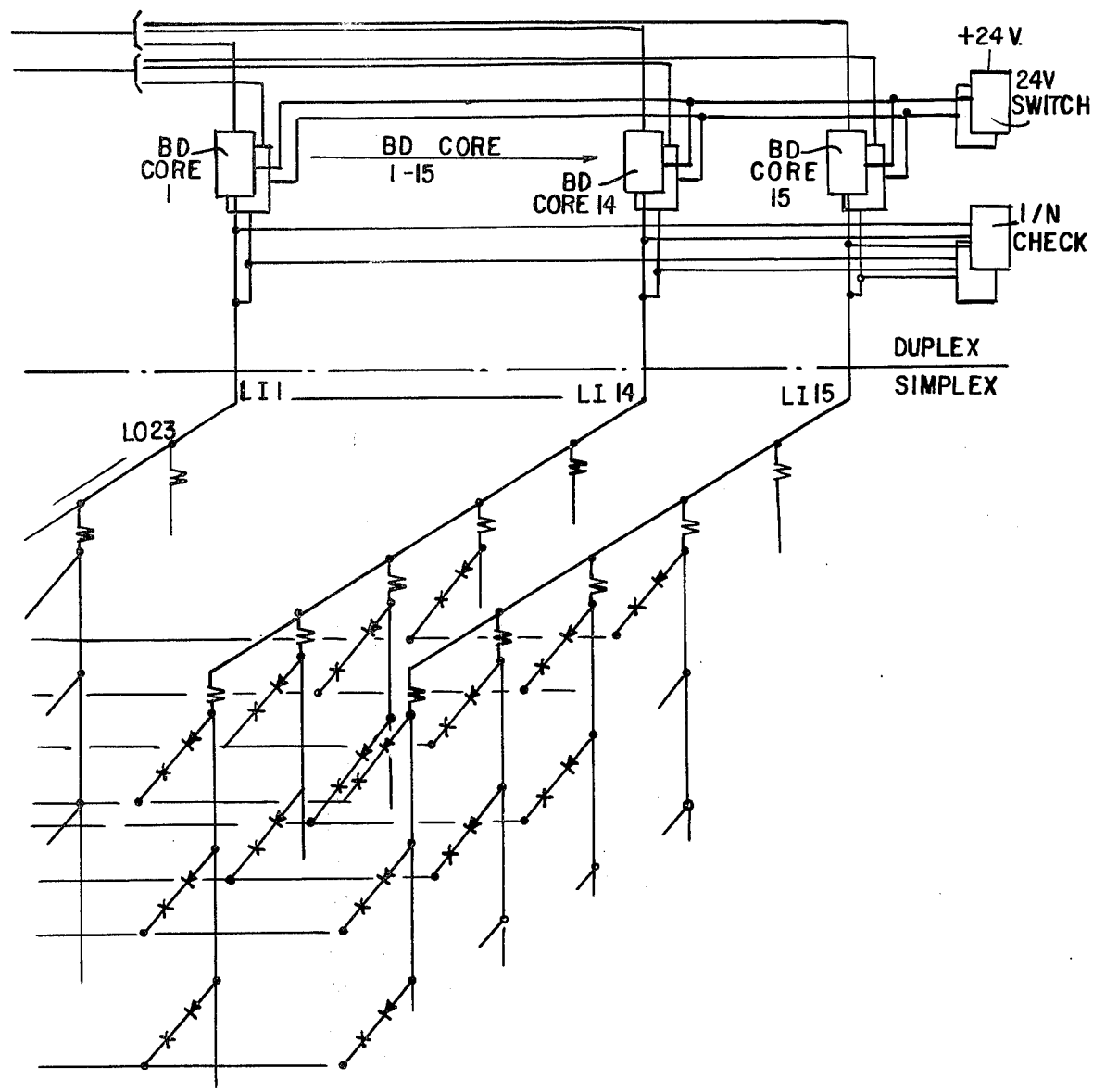

Referring to FIGS. 5 and 5A, the ring core scanner RCS comprises the access circuits for the scanning matrix COR and includes high current switching circuits which are used for driving current over long cable distances to the duplicated network status contacts and through sensing cores CO of the scanning matrix. The ring core scanner RCS includes core battery driver circuit BDCO, cable battery driver circuit BDCA, cable ground switching circuits GSCA, and core ground switching circuits GSCO. Referring to FIGS. 7 and 7A, the repeating relay contacts C are arranged in a 15 by 24 by 16 matrix in such a manner that each core battery driver BDCO serves a matrix of 24 by 16 network contacts, made up of 24 legs with each leg a multiple of up to fifteen contacts C. For scanning purposes, fifteen core battery driver circuits BDCO 0 – BDCO 15 are provided and have outputs connected to marix inputs LI 1 – LI 15. Also, fifteen cable battery drivers BDCA 1 – BDCA 15 and sixteen cable ground drivers GSCA 0 – GSCA 15 are provided.

The access circuits also include sixteen core ground switch circuits GSCO 0 – GSCO 15 which connect to conductors LO 0 – LO 15. The core battery drivers BDCO and the core ground switches GSCO are selectively operable in pairs to provide current paths over the matrix through the network contacts and associated sensing cores.

Each of the network contacts C, such as network contact C 1 is connected to the output of one of the core battery drivers, such as driver BDCO 1 via a resistor R 1 and a diode D 1, and is connected to the output of a core ground switch driver GSCO, such as driver GSCO, over a resistor R 2, a reverse connected Zener diode Z 2, diode D 2, and the drive winding of the core CO 0. Thus, the basic scanning circuit is seen to consist of a current source switch BDCO 1 feeding the contacts and a current sink switch GSCO 0 that permits the current flow through the core sensing elements. The cores operate as current transformers and serve to induce a pulse in a sense winding of the transformer in response to current flow through a drive winding of the core CO 0 to provide a signal to a sense amplifier SA 0.

The core ends of all the cables between the frame ATRF and the frame ATTF are kept positively charged through the use of cable battery driver circuit BDCA and the current source ends of the cables are negatively charged by using discharge resistors RD at the battery drive core circuits BDCO to minimize the effect of distributed cable capacitance. As can be seen in FIG. 7, the cable battery driver circuits BDCA0–BDCA15 are connected to inputs LB0–LB15 of the matrix and the ground switch cable driver GSCA0–GSCA15 are connected to inputs LC0–LC15 of the matrix.

The operation of the matrix access circuits are more easily understood by referring to the simplified basic scanning circuit shown in FIG. 7B. Upon initiation of the scan operation sequenced by the scanner unit TSU, the received address is decoded and specific circuits of the matrix access circuits are enabled such that one current source battery driver core circuit BDCO is switched on, one current sink ground switch cable circuit GSCA is switched on and one cable charger battery driver cable circuit BDCA is switched off. The current path at this time is from the driver BDCO through the contacts to the switch GSCA.

At this time a check is performed by the scanner unit TSU to insure that one and only one of each type of matrix access circuits BDCO, GSCA, BDCA has switched.

The selected core current sink ground switch core circuit GSCO is switched on, providing a possible path for the contact current to flow through the cores. However, no current will flow until the switch GSCA is switched off and accordingly, the potential at node A is lower than that required for the current inhibiter, embodied as a Zener diode, to conduct.

When the switch GSCA is turned off, as the potential at node A rises above the breakdown voltage for the Zener diode, the contact current path will suddenly switch from the portion including the cable ground switch GSCA to the portion including the core ground switch GSCO and a current pulse with a sharp rise time is provided through drive windings of the core inducing an output voltage in the sense winding of the core. The resultant output pulse is detected by the sense amplifier connected to the leg of the matrix which is being scanned and of the outputs provided by the 24 cores of a given leg are extended to the sense amplifier register.

Figure 6:
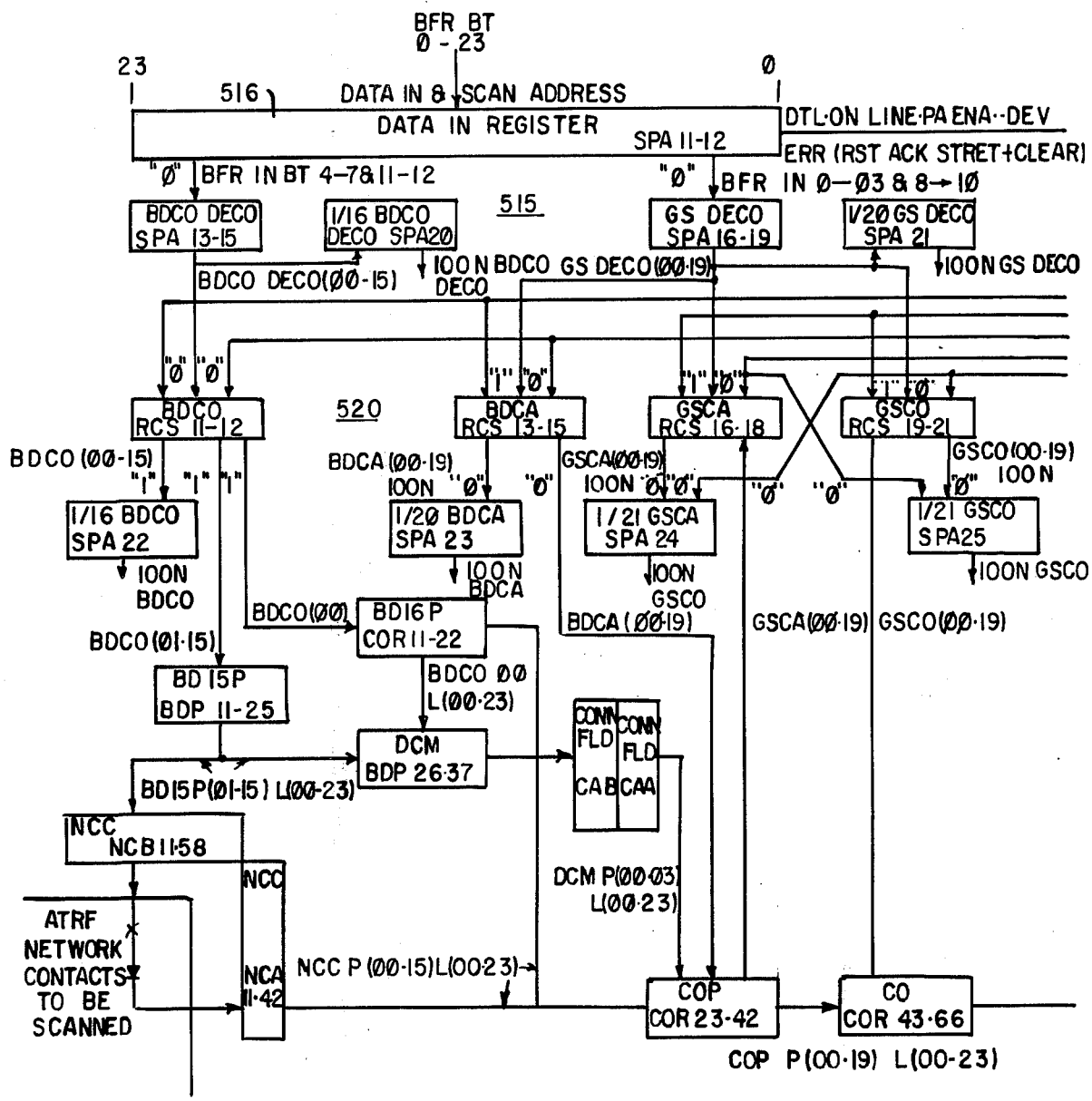
FIGS. 6 and 6A when arranged in a side by side relationship show a detailed block diagram of the scanner peripheral adapter of the ticketing scanner unit shown in FIGS. 5 and 5A.
Figure 6A:
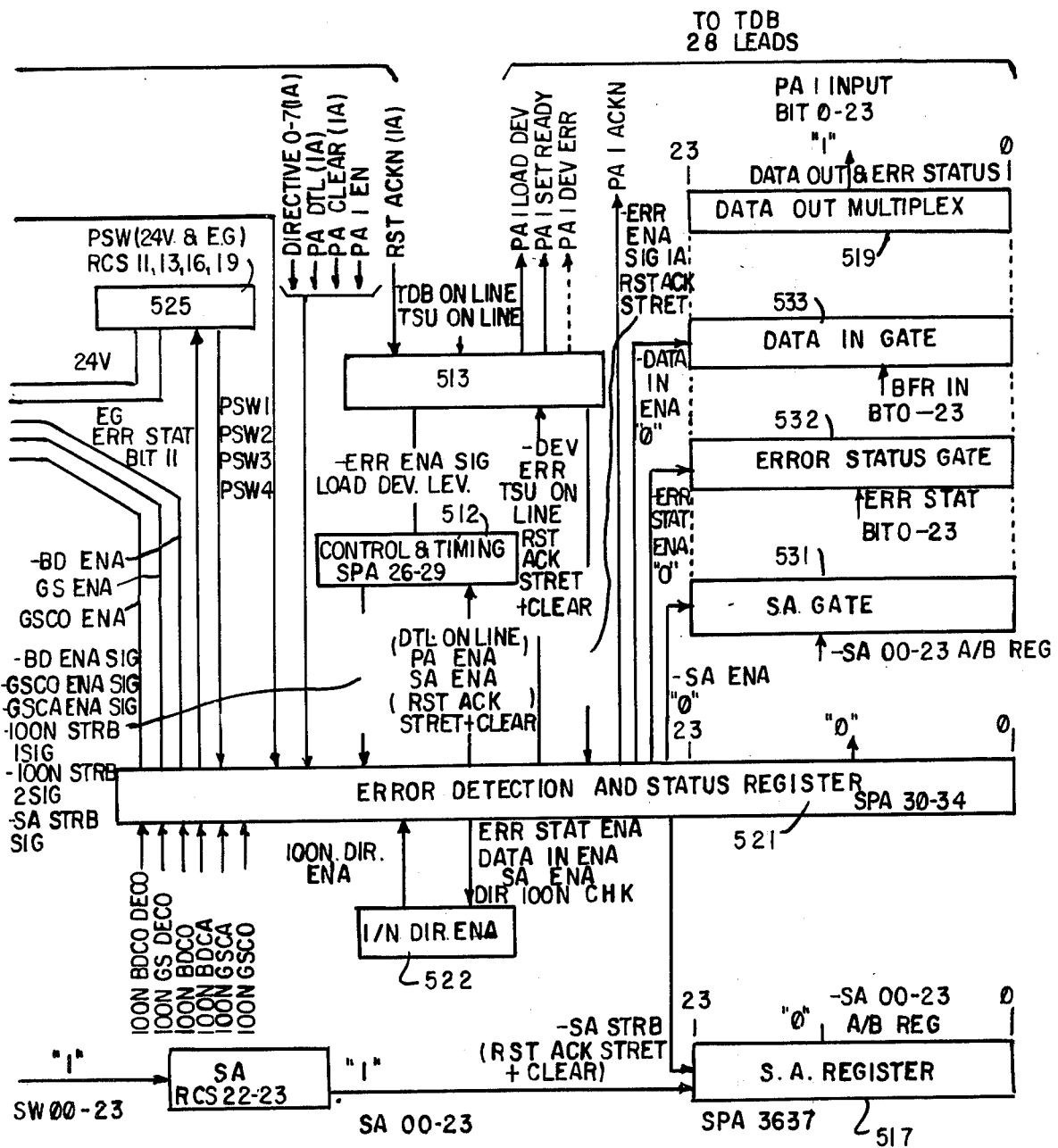

Referring to FIGS. 6 and 6A, each of the matrix access circuits including drivers BDCO, BDCA and drivers GSCA, GSCO has two inputs, one of which is extended to the output of the decoders BDCODECO, GSCECO respectively, and the other of which is extended to the output of the error and status register 521. Each of the matrix access circuits BDCO, BDCA, GSCA, GSCO also has two outputs one of which is connected to the matrix COD and the other of which is extended to one out of N check circuits 520.

By suitable selection of driver BDCO and GSCO groups, via the address decoders of the adapter SPA, a particular group of up to 24 network contacts C can be interrogated during a given scan operation.

The power switch circuit PSW, comprise a plurality of relays which are used to switch 24 volts onto the drive circuits BDCO and BDCA, and to switch electronic ground EG to the drive circuits GSCA and GSCO. These power switch circuits PSW are provided to obtain double isolation between the duplex channels for on line and off line modes of operation of the scanner TSU.

Referring to FIGS. 5 and 5A, the ring core scanner RCS interfaces with:
the scanning adapter as explained above
the battery drive peripherals BDP, via 15 heavy No. 22 gauge leads marked BDCO 01 to BDCO 15. the matrix circuits COR, via 85 leads made up of:
60 heavy No. 22 gauge leads marked
BDCA 00 to BDCA 19
GSCA 00 to GSCA 19
GSCO 00 to GSCO 19
1 heavy No. 22 gauge lead marked
BDCO 00
24 twisted pair marked
SW00 to SW23

Battery Driver Peripherals, BDP

These circuits include driver peripheral circuits BD15P and diode matrix check circuits DCM. There are 15 peripheral circuits BD15P each associated with one of the core drivers BDCO 01 to BDCO 15 and comprises 24 resistors, including resistor R1. Each resistor represents a BDCO leg serving a multiple of up to sixteen network contacts C on the current source side of the scan path. Each contact forms part of a leg in a plane of a driver GSCO group of circuits. These resistors limit the driving current into the ring cores CO and properly terminate the lines connecting the unit TSU to the Automatic Ticketing Repeating Relays Frames ATRF.

The diode matrix diode circuits DCM, in conjunction with four addition core ground switch drivers GSCO 16–19 form part of the checking facility for the unit TSU.

There are 24 matrix diode circuits DCM. Each check circuit DCM consists of a group of diodes arranged in a four bit diode check matrix. Each of the four bits represent a leg in one of GSCO 16 to GSCO 19. The inputs of these circuits are extended from the BD15P and BD16P (BDCO 00 legs). The four outputs are served by drivers GSCO 16 to GSCO 19. Two types of checks are achieved by these circuits.

a. Circuits associated with battery drivers BDCO are checked for correct operation. Here the diodes are considered as pseudo-closed network contacts. Therefore, by switching a driver BDCO and the appropriate driver GSCO group a scan data read-out of 1111 — 11 will be obtained from the sense elements.

b. In conjunction with driver BDCO 00 and its associated circuitry, checks are performed to insure there are no short circuited contact diodes and therefore eliminates sneak paths.

The battery drive peripheral BDP interfaces with:
the ring core scanner RCS, as explained above.
the interframe cabling connectors CAB, via 120 leads marked:
DCM POOLOO to BCD POO L23
DCM PO1 LOO to BCD to BCD PO1 L23
DCM PO2 LOO to BCD PO2 L23
DCM PO3 LOO to BCD PO3 L23
BCD 00 LOO to BDCO 00 L23
the network cable card NCB via
360 leads marked
BD15PO1 LOO to BD15P15 LOO
BD15PO1 LO6 to BD15P15 LO1
BD15PO1 L23 to BD15 L23

Matrix Circuits COR

Core Peripheral Circuits COP

There are twenty core peripheral circuits COP each individually associated with a driver GSCO group. Each peripheral circuit COP consists of 24 groups of discrete components each group forming a GSCO leg serving a multiple of up to fifteen network contacts.

Each group of discrete components contains an 80.6 ohm resistor to limit sense current and to properly terminate the return cable from the network contact.

Also 1.5K ohm resistors to limit line charge current for BDCA circuits. There are diodes associated with GSCA and zeners associated with the GSCO circuits.

Core Circuits CO

These cores are the sensing elements of the subsystem TSU. There are 24 core circuits CO. All of these consists of ferrite toroids operating as a current pulse transformer with a 1:23 turns ratio.

The circuits drive their inputs from the core peripheral circuits COD and their outputs are served by the driver circuits GSCO.

Battery Drive Peripheral Circuits BD16P

These circuits form part of the unit TSU checking facility. They consist of a battery core driver BDCO 00 feeding a multiple of 24 80.6 ohm resistors for current limiting and each resistor serving a multiple of sixteen diodes representing pseudo-closed network contacts. Each diode is then connected to its corresponding leg and plane of peripheral circuit COP.

Two types of checks are performed with these circuits.

a. By switching driver BDCO 00 and any driver group GSCO (except GSCO 1 and GSCO 17), a scan data read-out of 1111—11 is obtained. This checks the correct operation of the GSCO driver groups.

b. In conjunction with check circuits DCM, checks are performed to insure no shorted contact diodes exist and therefore detects sneak paths.

The matrix circuits COR interfaces with:
the ring core scanner RCS as explained above.
the connectors CAA via 120 leads marked:
DCM P00 L00 to BCD P00 L23
DCM P01 L00 to BCD P01 L23
DCM P03 L00 to BCD P01 L23
BDCO 00 L00 to BDC0 00 L23
the network cable NCA via 384 leads marked
NCC P00 L00 to NCC P00 L23
NCC P01 L00 to NCC P01 L23
NCC P15 L00 to NCC P15 L23

Interframe Cabling Connectors CAA and CAB

These are electronic card edge connectors dedicated for the interframe wiring.

They enable and facilitate the interconnection of circuitry from both frames of the unit TSU in order to make it one integral unit.

The connectors CAA interface with:
the matrix circuit COR as explained above
the cable circuit CAB, via 120 leads on a 1:1 ratio basis The connectors CAB interface with:
the battery drive peripherals BDP as explained above;
the cable circuit CAA, via 120 leads on a 1:1 ratio basis.

Network Cable Cards NCA and NCB

There are as many of these circuits as are required to do the interconnections between the frames ATTF of the unit TSU and the Automatic Ticketing Repeating Relay frames ATRF containing the contacts to be monitored.

These circuits are 1:1 pulse transformers connected in the lines in Balun configuration. They present low impedance to the signal pulse and high impedance to common mode noise.

The network card NCA interfaces with:
the matrix circuits COR as explained above;
the frame ATRF1, via up to 192 twisted pair leads, (FIGS. 6, 6A) formed in up to sixteen cables each of fifteen twisted pairs.
The leads are marked:
NCC P00 L00 LIVE to NCC P00 L23 LIVE
NCC P01 L00 LIVE to NCC P01 L23 LIVE
NCC P07 L00 LIVE to NCC P07 L23 LIVE and
NCC P00 L00 RETURN to NCC P00 L23 RETURN
NCC P01 L00 RETURN to NCC P01 L23 RETURN
NCC P07 L00 RETURN to NCC P07 L23 RETURN
The LIVE wires carry the sense current signals and the RETURN wires are their corresponding twisted pairs.

The card NCA interfaces with:
the matrix circuits as explained above
the frame ATRF1, via up to 192 twisted pair leads, formed in up to sixteen cables each of 15 twisted pairs.
The leads are marked:
NCC P00 L00 LIVE to NCC P00 L23 LIVE
NCC P01 L00 LIVE to NCC P01 L23 LIVE
.
.
.
NCC P07 L00 LIVE to NCC P07 L23 LIVE and
NCC P00 L00 RETURN to NCC P00 L23 RETURN
NCC P01 L00 RETURN to NCC P01 L23 RETURN
.
.
NCC P07 L00 RETURN to NCC P07 L23 RETURN
The LIVE wires carry the sense current signals and the RETURN wires are their corresponding twisted pairs.

The frame ARTF2, via up to 192 twisted pair leads, formed in up to 16 cables each of 15 twisted pairs.
The leads are marked:
NCC P08 L00 LIVE to NCC P08 L23 LIVE
NCC P09 L00 LIVE to NCC P08 L23 LIVE
.
.
NCC P15 L00 LIVE to NCC P15 L23 LIVE and
NCC P08 L00 RETURN to NCC P08 L23 RETURN
NCC P09 L00 RETURN to NCC P09 L23 RETURN
.
.
NCC P15 L00 RETURN to NCC P15 L23 RETURN
The LIVE wires carry the sense current signals and the RETURN wires are their corresponding twisted pairs.

The card NCB interfaces with:
the battery drive peripherals BDP as explained above;
the frame ATRF1, via up to 360 twisted pair leads, formed in up to 24 cables each of 15 twisted pairs.
The leads are marked:
BD15P01 L00 LIVE to BD15P01 L23 LIVE
BD15P02 L00 LIVE to BD15P02 L23 LIVE
.
.
BD15PP15 L00 LIVE to BD15P15 L23 LIVE and
BD15P01 L00 RETURN to BD15P01 L23 RETURN
BD15P02 L00 RETURN to BD15P02 L23 RETURN BD15P15 L00 RETURN to BD15P15 L23 RETURN The LIVE words carry the sense current signals and the RETURN wires are their corresponding twisted pair.

The frame ATRF2, via up to 360 leads, formed in up to 24 cables each of 15 twisted The leads are marked in exactly the same manner as in frame ATRF 1 above.

OPERATION OF THE TICKETING SCANNER UNIT

Modes of Operation

This section describes in detail the hardware flowcharts of the unit TSU, which are shown in FIGS. 8–17. Also pertinent signal timing relationships are shown in FIGS. 18–24. The ticketing device buffer TDB is described in the application 432,803, now abandoned of L. Lattanzi, G. Grzybowski and P. Harrington.

For ease of understanding, the flowcharts of the subsystem have been divided into functional blocks:
  a. The flowcharts shown in FIG. 5 illustrate the manner in which the unit TSU behaves under different directives to effect the following operations:
    1. Switch on/Switch off
    2. Scan
    3. Data In Loop
    4. Directive 100N check
    5. Error Status These are therefore the basic routines for the unit TSU which could be taken in-block and used in the different application programs for the unit TSU such as Ticketing program, Maintenance programs.
  b. The flowcharts shown in FIGS. 8–17 relate to the communication between the circuit TDB and the circuits SPA-A, SPA-B, and set forth subroutines which describe the sequence of events necessary for the transmission of data and commands, specifically:

Select Instructions, Data In, and Data Out. These subroutines are taken and included in-block in the basic routines of the unit TSU.

SPA Directives and Controls

The scanner SPA employs the following input/output format and controls:

The unit TSU responds to the following Directives and Controls from the circuit TDB.

(a) Directives
X Y Z     Fields of SEL INST
. . .
. . .
. . .

| | |
|---|---|
| 1 0 0 | DIRECTIVE 0(1A), ERR STAT ENA enables the error status of TSU (except TDB) on the TDB input lines. No timing required. |
| 1 0 1 | DIRECTIVE 1(1A), DATA IN ENA in conjunction with PA (DTL(1A) and the SPA timing, enables Data to be received from the circuit TDB and returned to the circuit TDB. |
| 1 0 2 | DIRECTIVE 2(1A), SA ENA in conjunction with signal PA DTL (1A) and timing signals provided by the circuit SPA causes Data to be received from the circuit TDB and a Scan to occur on Network Contacts or pseudo-closed contacts in the unit TSU. The scan data is then fed back to the circuit TDB. |
| 1 0 3 | DIRECTIVE 3(1A), DIR 1 of N CHK in conjunction with signal PA DTL(1A) and the timing of circuit SPA effective only at the last pulse introduces an error in the DIR 100N CHK circuitry, forcing a DEVICE ERR output to be provided by the scanner SPA. |
| 1 0 5 | DIRECTIVE 5(1A), SPA OFF LINE causes the +24v and the EG to be switched off from the circuits BDCO, BDCA and GSCA, GSCO, to render these circuits unaddressable. |
| 1 0 6 | DIRECTIVE 6(1A), SPA ON LINE causes the +24v and the EG to be switched on for the circuits BDCO, BDCA and GSCA, GSCO to render these circuits addressable. |
| 1 0 7 | DIRECTIVE 7, in conjunction with signal PA DTL(1A) and timing of the circuit SPA effective only at the last pulses introduces an error in DIR 100N CHK circuit. This results in a DEVICE ERR (only in the circuit SPA). | b. Controls

PA 1 EN gates DIRECTIVES 0, 5 and 6 and signal PA DTL (1A) into the error and status register. PA1 EN is registered, causing PA 1 ACKN to be sent back to the circuit TDB and signal PA ENA REG to be used internally in the circuit SPA control to gate DIRECTIVES 1, 2 and 3.

PA DTL(1A), when ANDed with PA 1 EN and —ERR STAT BT11, ON LINE, —DEV ERR, causes data to be gated from the circuit TDB and into the circuit SPA DATA IN REG. Also it causes the timing of the circuit SPA to begin by gating the clock in the counter. To insure that the circuit SPA has been cleared at the end of every operation this ANDed signal clocks a divide by 2 flip flop such that if RST ACKN (1A) is not received a PA1 DEVICE ERR is sent to the circuit TDB.

RST ACKN (1A) is sent to the circuit SPA upon receipt of PA 1 ACKN after a PA 1 EN signal by the circuit TDB. The signal RST ACKN (1A) is also received from the circuit TDB after the circuit SPA sends it a signal PA1 SET READY. In both cases the signal RST ACKN(1A) is converted into RST ACK STRET which ORed with PA CLEAR (1A), is used to clear the circuitry of the circuit SPA at the end of operation and resets the latch circuit PA 1 EN.

PA CLEAR(1A), received from the circuit TDB and ORed with signal RST ACK STRET clears the circuitry of the scanner peripheral adapter after operation.

PA 1 ACKN signal is sent to the circuit TDB whenever the circuit SPA receives signals PA 1 En or PA DTL(1A).

PA1 LOAD DEV is sent to the circuit TDB to indicate that data is available at the circuit SPA Data Out Multiplex to cause that data to be entered into the circuit TDB data register and a SENSE READY signal to be sent to the unit CPU. This is the "last but one" timing signal of the circuit SPA.

PA1 SET READY signal is sent to the circuit TDB and indicates the end of operation causing the circuit TDB to set its READY FF and return the signal of RST ACKN(1A) to the circuit SPA. It is the last timing signal of the circuit SPA.

PA1 DEVICE ERR signal is staticised in the circuit SPA and sent to the circuit TDB whenever an error occurs in the operation of the unit TSU except circuit TDB.

It is eventually transmitted to the unit CPU by the circuit TDB as a signal ERR INT. (Used only by maintenance personnel who must add a test jumper).

The Data In routine comprises eight bits which are used to enable matrix access circuits and 15 bits used for maintenance purposes.

| Scan Address | | | | | | | | | | | | | |
|---|---|---|---|---|---|---|---|---|---|---|---|---|---|
| 23 | 15 | 14 | 13 | 12 | 11 | 10 | 9 8 | 7 | 6 | 5 | 4 | 3 | 2 1 |
| a. | b. | c. | | BDCO MAIN | | GS MAIN | | BDCO ADD FIELD BDCO- 0 15 | | | | GS ADD FIELD GS- 0 15 | | a. INHIBIT RS ACKN
b. GENERATE TIMING ERROR
c. NOT USED

Bits 0 to 3 are decoded by the GS DECO to operate on GSCO groups BDCA, GSCA, GSCO such that:

```
BIT    3 2 1 0
       0 0 0 0 =    GSCO 00 group
       0 0 0 1 =    GSCO 01 group
         .
         .
       1 1 1 1 =    GSCO 15 group
```

Only these groups are used for scanning purposes.

In conjunction with Bit 8, this field is extended for maintenance purposes only and serves:

```
Bit    8 3 2 1 0
       1 0 0 0 0    GSCO 16 groups
       1 0 0 0 1    GSCO 17 groups
         .
         .
       1 0 0 1 1    GSCO 19 groups
```

Bit 9 is used, for maintenance only, to simulate no selection for circuits GS DECO, GSCA, GSCO, and GDCA (1/N)

Bit 9. GS00 = GS DECO ERROR
Bit 9. GS01 = GSCA ERROR
Bit 9. GS02 = GSCO ERROR
Bit 9. GS03 = BDCA ERROR

Bit 10 is used, for maintenance only, to simulate, at the inputs of 1 of N check circuits, a double selection of circuits GSCO 19 and whichever is selected by the normal GS field (bits 0 to 3 and 8).

Bits 4 to 7 are decoded by the circuits BDCO DECO to operate on the circuits BDCO such that:

Bit 7 6 5 4
0 0 0 0 BDCO 00 for maintenance only
0 0 0 1 BDCO 01
0 0 1 0 BDCO 02
1 1 1 1 BDCO 15

BDCO 01 BDCO 15 are used for scanning purposes.

Bit 11 is used, for maintenance only, to simulate a circuit BDCO, circuit DECO and circuit BDCO. "no selection error".

Bit 11 . BDCO 01 = BD DECO ERR
Bit 11 . BDCO 02 = BDCO ERR

Bit 12 is used, for maintenance only, to simulate at the inputs of 1 of N check circuits, a double selection of input 19 of 1/N and whichever circuit BDCO is selected by the normal field of circuit BDCO (Bits 4 to 7).

Bit 14 is used, for maintenance only, to generate a timing error.

Bit 15 is used, for maintenance only, to inhibit RST ACKN STRET, thus preventing reset of the status word at the end of the scan cycle.

Data Out is obtained from:
Data In
Used for maintenance, is exactly as the Data In received.
Scan Data Out
Obtained from the sense amplifier register 517 with:
Bit 0 = Leg 0 or Core 0
Bit 1 = Leg 1 or Core 1
.
.
Bit 23 = Leg 23 or Core 23
SPA error status register
BIT 4 SA STRB REG indicates register SA STRB is always high.
BIT 5 BD ENA indicates signal BD ENA is always high.
BIT 6 1 of N GSCO . 1 of N STRB 2 is true at 1 of N STRB 2 if:
1. there is no GSCO selection
2. there is more than 1 GSCO switched on
BIT 7 1 of N GSCO . 1 of N STRB 1
At 1 of N STRB 1 the circuit GSCO is switched off. To prevent an unnecessary error indication, GSCA ENA is presented as a separated input to the 1 of N Check Circuit GSCO.

Therefore bit 0 is true only if there is already a circuit GSCO switched on permanently when the GSCA is turned on.

BIT 8 1 of N GSCA . 1 of N STRB 2 at 1 of N STRB 2; the GSCA is turned off.

To prevent an unnecessary error indication, GSCO ENA is presented as a separate input to the 1 of N Check Circuit GSCA.

Therefore bit 3 is true only if there is already a circuit GSCA permanently switched on when the circuit GSCO is turned on.

BIT 9 1 of N GSCA . 1 of N STRB 1 is true at 1 of N STRB 1 if:
1. there is no selection of circuit GSCA
2. there is more than 1 switched on circuit GSCA
BIT 10 1 of N BDCA . (1 of N STRB 1 + 1 of N STRB 2)

since the circuit BDCA is selected (turned off) at the very beginning of the scan operation and remains so during the whole cycle, bit 10 is true at 1 of N STRB 1 1 of N STRB 2 if:
1. there is no selection of circuit BDCA
2. there is more than 1 switched off circuit BDCA BIT 11 1 of N BDCO . (1 of N STRB 1 + 1 of N STRB 2)

since the circuit BDCO is selected (turned on) at the very beginning of the scan operation and remains so during the whole cycle, bit 11 is true at 1 of N STRB 1 1 of N STRB 2 if:
1. there is no selection of circuit BDCO
2. there is more than 1 switched on circuit BDCO BIT 12 1 of N GS DECO shows a continuous indication of the status of the decoder circuit GS.

This bit is true if:
1. there is no selection of circuit GS
2. there is more than 1 selected circuit GS BIT 13 1 of N BDCO DECO shows a continuous indication of the status of the decoder circuit BDCO.

This bit is true if:
1. there is no selection of circuit BDCO
2. more than 1 circuit BDCO is selected.

BIT 14 TIMING ERR is true if at ERR ENA SIG we find that one of the timing signals required for the correct scan operation is missing.

This is applicable for Scan Directive SEL 102.

With Data In Directive SEL 101, SA ENA is false and inhibits all the timing signals used for scanning. Therefore to prevent an unnecessary error indication signal SA ENA also inhibits the timing error from propagating.

BIT 15 ERR ENA SIG is true whenever ERR ENA SIG is detected in the circuitry of unit TSU i.e. at the end of operation for SEL 101 and SEL 102 and SEL 103.

BIT 16 DIR 5, OFF LINE is true when the OFF LINE Directive SEL 105 is received.

BIT 17 PSW ERR, OFF LINE is true if any of the relay Power Switches PSW is in the on position.

This bit indicates that the unit TSU is not correctly OFF LINE.

BIT 18 DIR 6, ON LINE is true when the ON LINE Directive SEL 106 is received.

NOTE

BITS 16 and 18 are never true at the same time. In such a case the state of the unit TSU is undetermined and the DC Power on one of the ATT Duplex Pair should be turned off before attempting to exercise the other.

BIT 19 PSW ERR, ON LINE is true if any of the relay Power Switches PSW is in the off position.

This bit indicates that the unit TSU is not correctly ON LINE.

BIT 20 RST ACK ERR is true if for any reason the unit TSU receives two signals DTL from the circuit TDB without being reset in between.

BIT 21 1 of N DIR ENA ERR. — ERR STAT ENA is true if during any operation of unit TSU other than ERR STAT ENA Directive SEL 100 we have more than 1 set directive.

BIT 22 1 of N DIR ENA ERR . ERR STAT ENA is true if when Directive ERR STAT ENA SEL 100 there is more than 1 set directive.

BIT 23 ERR STAT ENA is true whenever Directive ERR STAT ENA SEL 100 is received.

```
-ERR STAT BT 18 = BD ENA
            19 = 100N STRB 1 REG.
            20 = GSCO ENA
            21 = GSCA ENA REG.
            22 = SA STRB REG.
            23 = 100N STRB 2 REG.
```

Operation of the Scanner Unit

Referring to FIGS. 6 and 6A, there is shown a detailed block diagram of the scanner peripheral adapter SPA. As indicated above, data bits 0 to 7 of the data IN supplied by the unit CPU via buffer TDB provide address data for the matrix access circuit and bits 8 to 23 are used for maintenance and control purposes. The address bits are extended over decoder circuits BDCO DECO and GS DECO which provide enabling outputs for the matrix access circuits, including the core battery driver circuits BDCO, cable battery drive circuits BDCA, cable ground switch GSCA, and core ground switch circuits GSCO.

The checking circuits 520 associated with the matrix access circuits include one-out-of-N checking circuits for the battery drive decoders BDCO, DECO and for the ground switch decoder circuits GS DECO as well as one-out-of-N checking circuits 520 for the cable and core battery drivers, and the cable and core ground switches.

Figure 6B:
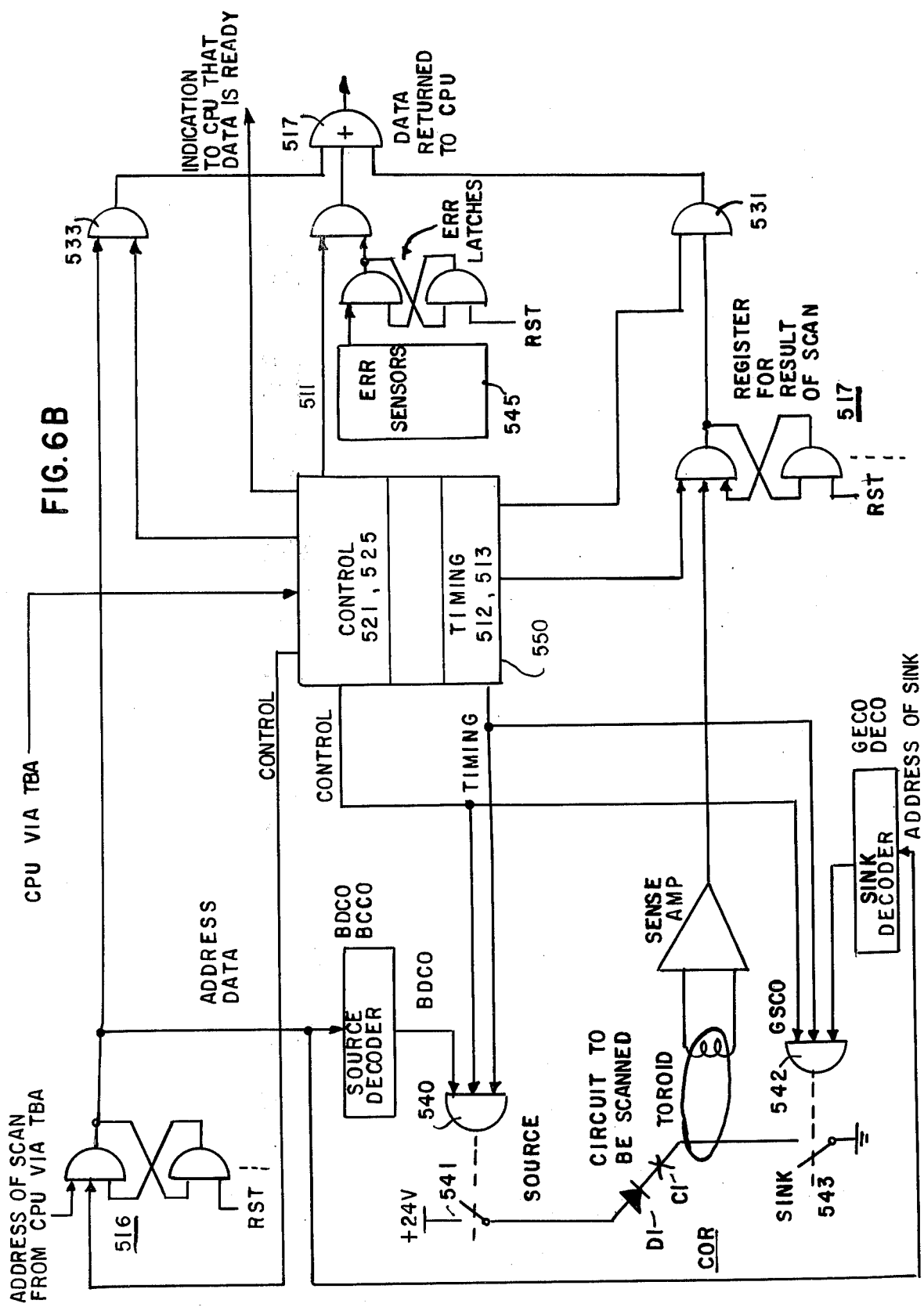
FIG. 6B is a simplified block and partial schematic circuit diagram of the scanner unit.

The data bits 8–23, which represent maintenance and control information, are extended to the error detection and status register 521 which is comprised of a plurality of latch circuits which provide control signals for various circuits of the scanner unit TSU, including the control and timing circuit 512, the delay timing circuit 513, and the matrix access circuits. The status register 521 also provides control signals for enabling the sense amplifier gate 531 which gates outputs of the sense amplifier register 517, including the 24-bit data word resulting from a given scan to the data output multiplexer 519. The status register 521 provides further enabling signals for the error status gate 532 and the data in gate 533 which permit error data and data received in the data register 516 to be extended to the central processor CPU over the data output multiplex 519. It is pointed out that the data in gate 533, the error status gate 532, the sense amplifier gate 531 and the data output multiplex 519 each comprise 24 gate circuits, only one of which is shown in FIG. 6B.

In addition, the scanner unit peripheral adapter SPA further includes a power switch circuit 525 enabled by outputs of the status register to extend +24 volts and electronic ground EG to the matrix access circuits.

The power switch circuits 525 in each of the duplicated scanner peripheral adapter units SPA-A, SPA-B are selectively enabled in response to directives provided by the central processing unit CPU such that in the active scanner unit TSU, the power switch circuit 525 is enabled while in the inactive or standby scanner unit TSU, such power switch circuit 525 is disabled.

Considering a typical scan operation for the active scanner unit TSU for a DDD call, after cut-through, the identity of the trunk is indicated in the activity bit table, and the calling number and called number are stored in the trunk call record table. Accordingly, when the activity bit for the trunk is set true, the scan interrupt routine is initiated to monitor the status of the trunk. The status of the busy trunk is monitored by the scanner under the control of the common control of the system which supplies the address of the leg of the scanner matrix which includes the slave relay answer and hold contacts associated with the busy trunk circuit being monitored.

Referring to FIG. 6B, which is a simplified schematic representation of the scanner unit TSU, the scanner receives an instruction, which is a command to perform the scan of the designated relay contact and simultaneously receives the address of the scan. The address is received by and stored in the data IN register 516 which is comprised of a plurality of latch circuits, 24 in the present embodiment. The directive or command is extended directly to the control circuit 550 over separate data lines. The timing control circuit 550 includes the power switches 525, the timing and control circuit 512 and the delay timing circuit 513, and the error and status register 521.

At the reception of the command, the control circuit 550 initiates the generation of timing pulses which then, until the end of the scan cycle, control sequencing of operation of the scanner unit TSU.

The address data stored in the data IN register 516 is extended to the source decoder BDCO DECO and the sink decoder GSCO DECO, which responsively provide signals for enabling the particular battery driver BDCO and ground driver GSCO designated by such address. The output of the source decoder BDCO DECO is extended to an input of the driver BDCO which basically comprises a gate circuit 540 and a switch 541 which is preferably an electronic switch. Similarly, the output of the sink decoder GSCO DECO is extended to an input of the ground switch circuit GSCO which is comprised of a gate circuit 542 and a switch circuit 543. Second and third inputs to gates 540 and 542 are connected to outputs of the control circuits 550 which provide clock signals for the driver circuits BDCO, GSCO.

The required current source BDCO is switched on in response to a first timing pulse BD ENA SIG, provided by the control circuit 550. At a later timing pulse GSCO ENA SIG, the required current sink GSCO is turned on. When the ground switch driver GSCO is turned on, the scan path is established through the matrix COR and if the network contact C included therein is closed, a pulse is induced in the sense winding of the associated core CO. Such pulse is extended to the associated sense amplifier SA and thence to the sense amplifier register 517. The sense amplifier register 517 comprises twenty-four latch circuits, and at the end of a scan, the sense amplifier register 517 stores the status of the twenty-four contacts for the given leg of the sense matrix which has been addressed by the central processing unit CPU. The data pulses provided by the sense amplifier SA are gated into the sense amplifier register 517 in response to a further timing pulse SA STRB SIG provided by the control circuit 550.

After the scan data has been stored in the sense amplifier register 517, the control circuit 550 sends a signal PA1 LOAD DEV to the buffer TDB, indicating that the data is ready. At such time, the control circuit 550 enables the sense amplifier gate 531 to enable the contents of the sense amplifier register 517 to be gated to the data out multiplex gate circuit 519 and thence to the central processing unit CPU via the buffer TDB and the multiplex CCX.

The scanning of a given path is continued until a disconnect condition is indicated as the result of a given scan operation. At such time, the change in the status bit for the contacts associated with the original path is used by the central processing unit CPU to effect recording of the time duration for the conversation over the path.

During the normal scan operations, or any maintenance routine, self-checking circuits of the scanner unit TSU are operable in response to error conditions provided by a plurality of error indicating circuits 545. Such error data is gated into the error latch circuit 517 and may be extended to the central processor unit CPU over the error status gate 532 and the data multiplex 519 in response to a further control signal provided by the control circuit 550.

Moreover during certain maintenance routines, it is desirable to enable transmission of data received by the data in register of the scanner unit TSU back to the central processing unit CPU. Accordingly, a data IN gate 533 is provided which is enabled by a further output of the control circuit 550 to permit the data stored in the data in register 516 to be transmitted to the central processing unit CPU.

A detailed description of the modes of operation of the scanner unit TSU is provided in the following paragraphs which makes reference to the hardware flowcharts. Switch on and Switch off operations.

In the system a program receives a request for the reconfiguration of the unit TSU from sources such as:
1. Maintenance Personnel, via the teletypewriter TTY
2. Maintenance Programs
3. Error Interrupt Handlers
4. Timed Routine Scheduler This program analyzes the request for validity i.e., can the request be met without upsetting the working mode of the system and from the System Status Table decides which unit to switch ON and which to switch OFF.

These Switch ON/Switch OFF routines are therefore controlled by the Software and the Hardware operations for these routines are as follows:

Switch ON DIRECTIVE 5 (1A) true, and DIRECTIVE 6(1A) false.

Referring to FIGS. 5, 5A, 9, 15 and 24, this routine consists of a single sequence, started by a SEL INST with $X=1$, $Y=0$ and $Z=6$ block 901, FIG. 9, and line 3, FIG. 24. The circuit 509 of buffer TDB decodes these fields into only DIRECTIVE 6(1A) true (FIG. 15, blocks 1501 and 1519) and passes it on, with PA 1 EN FIG. 24, line 4, to the status register 521 of scanner adapter SPA. The output of the staticizer 521 PA 1 EN is PA 1 ACKN and is sent back to the buffer TDB FIG. 24, line 5 and FIG. 15, block 1520, which responds with RST ACKN (1A) FIG. 24, line 6 and FIG. 15, block 1523. The timing circuit 513 of the adapter SPA stretches RST ACKN (1A) to RST ACK STRET and uses RST ACK STRET + CLEAR to reset all its circuitry, FIG. 24 line 7. On receipt of DIRECTIVE 6(1A) and PA 1 EN two operations result in the scanner adaptor SPA:

1. It staticizes DIRECTIVE 6(1A). PA 1 EN and the output —ERR STAT BT 11, ON LINE, of this ON/OFF latch switches the circuits of PSW ON, FIG. 9, blocks 904, 905 and FIG. 24, line 8. Feedback signals are obtained from the power switch circuits 525 FIG. 5A (PSW1 to PSW4) which are gated into latches —6A STAT BT6, PSW ERR ON LINE, and —ERR STAT BT7, PSW ERR OFF LINE of status register 521, to indicate that the circuits 525 PSW are all ON or all OFF respectively. The —ERR STAT BT19 is an input to the latch PA1 DEVICE ERR of the register 521 and sets the latch (FIG. 24, line 10) if any of the circuits of PSW are OFF. The other output of the ON/OFF latch —ERR STAT BT16 is used with —ERR STAT BT19 to enable latch PA DTL (1A) of the status register 521 to start the counter/timer 512 SPA thus insuring that the circuit SPA does not operate unless all the circuits of PSW are correctly switched ON and the circuit SPA is ON LINE.

2. But because the circuits of PSW are relay operated they are slow in operation and the error detection circuit recognizes, via —ERR STAT BT6, that one or more switches of PSW are still OFF. The Error Detection circuit therefore generates a DEVICE ERR signal. This signal is not sent to the buffer TDB. Software: at block 903, FIG. 9, 1. times a delay of 16.6 ms. (FIG. 24, line 12) to allow for the operation of the circuit PSW 525 and then interrogates the Error Status of the scanner SPA to insure that a correct reconfiguration of the subsystem has accomplished, FIG. 9, blocks 906, 907.

This is indicated by:
—ERR STAT BT19, PSW ERR ON LINE — false
—ERR STAT BT17, PSW ERR OFF LINE — true
—ERR STAT BT16, OFF LINE — false
—ERR STAT BT18, ON LINE — true 2. Clear the channel.
Switch OFF DIRECTIVE 5(1A) — true and DIRECTIVE 6(1A) — false.

Referring to FIGS. 5, 5A, 9, 15 and 24, this routine consists of a single sequence which is started by a SEL INST with $X = 1$, $Y = 0$ and $Z = 5$ block 911, FIG. 9, line 35, FIG. 24. The circuit 509 of buffer TDB decodes these fields into only DIRECTIVE 5(1A) true and passes it on with PA 1 EN to the circuit SPA, FIG. 15, blocks 1501–1519. FIG. 24, line 4.

The output of the PA1 EN staticizer 521 is PA 1 ACKN and is sent back to the status register 521 of the buffer TDB which responds with RST ACKN (1A). The timing circuit 513 of scanner SPA stretches RST ACKN (1A) to RST ACK STRET and uses RST ACK STRET + CLEAR to reset all its circuitry. FIG. 24, lines 5–7, FIG. 15, blocks 1520–1523.

Again because of the time delay in the operation of the PSW circuits 525, these might remain ON for a certain time and therefore —ERR STAT BT19 does not show a PSW ERR, ON LINE, and may not trigger the DEVICE ERR latch of the status register 521. This signal is not sent to the circuit TDB.

The Software at block 713, FIG. 9, therefore has to time a period of 16.6 ms. (FIG. 24, line 12) before;

1. reading SPA's ERR STAT to insure correct switch OFF of that unit.
2. addressing the duplicate equipment. Correct switch OFF is indicated by;
—ERR STAT BT19, PSW ERR ON LINE — true
—ERR STAT BT17, PSW ERR OFF LINE — false
—ERR STAT BT16, OFF LINE — true
—ERR STAT BT18, ON LINE — false In the switch OFF status the unit TSU does not operate and only responds to a switch ON instruction, DIRECTIVE 5(1A) is false and DIRECTIVE 6(1A) is true.

Scan Operation DIRECTIVE 2(1A) true.

For the purpose of this, and subsequent descriptions, it is assumed that the unit TSU circuit SPA is switched ON correctly i.e., all the switches PSW are ON and —ERR STAT BT19, PSW ERR ON LINE — true
—ERR STAT BT17, PSW ERR OFF LINE — false Referring to FIGS. 5, 5A, 8 and 19, the scan routine can be initialized in the unit TSU by the ticketing application program, for monitoring the network circuits through their repeating relays and for maintenance routining and repair verification program to check the operation of the unit TSU, and in particular, the self checking facilities, such as the check circuits 1 of N.

This routine consists of four sequences:

1. PA SEL INST. (FIGS. 8, blocks 801, 802, FIG. 15, blocks 1501–1523, FIG. 19, lines 11–14)

The routine is started by a SEL INST with $X = 1$, $Y = 0$, and $X = 2$. The circuit TDB decodes these fields into only DIRECTIVE 2(1A) true (FIG. 15) and passes it on, with PA1 EN, to the status register 521 of the scanner adapter SPA. The signal PA 1 EN is latched into PA1 ACKN which is sent to the buffer TDB which responds with RST ACKN (1A), FIG. 15, block 1523, FIG. 19, line 7.

Figure 19:
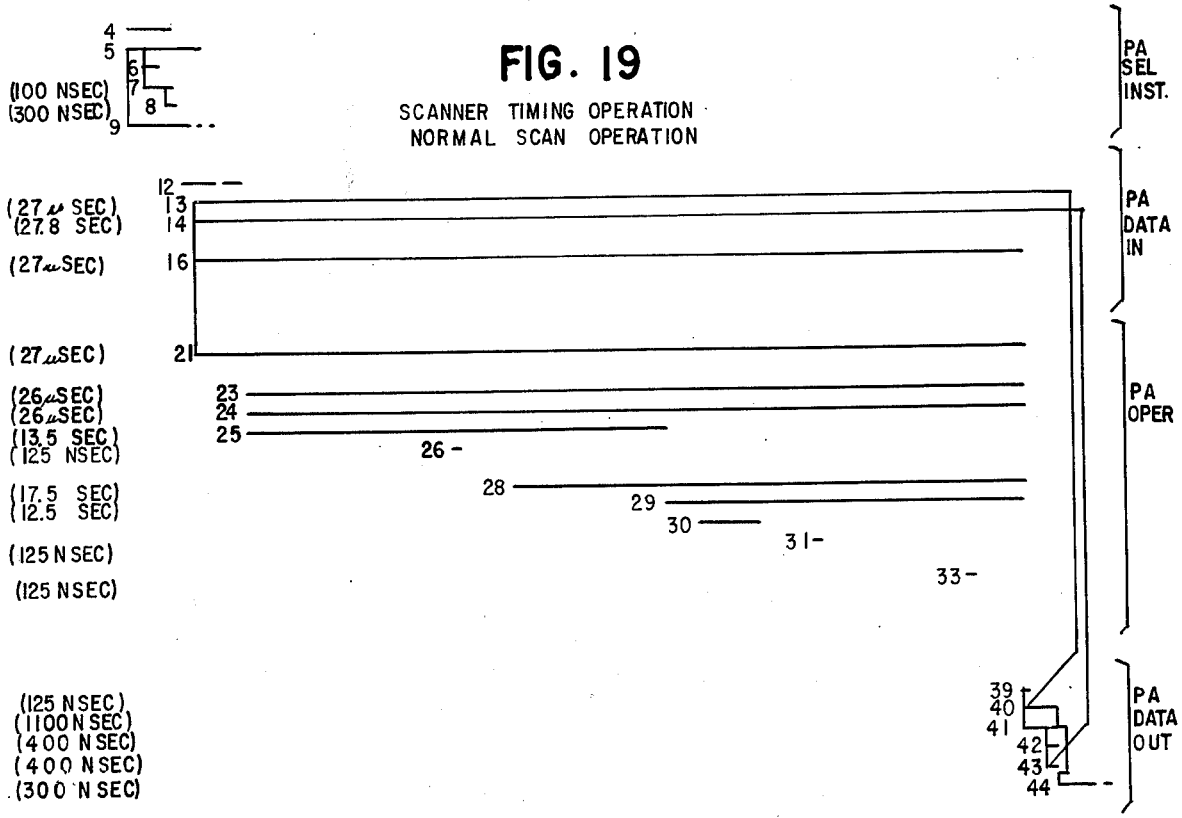

After stretching RST ACKN (1A) to a 1.1 Ms. pulse, the adapter SPA uses RST ACK STRET + CLEAR to reset all its circuitry (FIG. 19, line 8). The adaptor SPA also latches PA 1 ACKN into PA ENA REG of status register 521. This latch is reset whenever PA 1 EN — false such as before a SEL INST. The level PA ENA REG is used to gate DIRECTIVE 2(1A) into the status register 521. The output (FIG. 19, line 9) of a gate SA ENA true, is fed to the 1 of N Directive Enable Check circuit 522 to insure that only that directive has been selected. If there is a fault, the output of the 1 of N Directive Enable Check circuit 522 is gated by ENA ERR SIG just prior to the end of the operation of the scanner SPA when the output of the gate, 100N DIR ENA GATED, sets PA 1 DEVICE ERR latch and sets —ERR STAT BT21 of the SPA Error Status latch. With SA ENA true, the data in the SA Register 517 is gated to Data Output Multiplex 519.

2. PA DATA IN (FIG. 8, blocks 804, 805)

A Scan Address, as explained above, is sent by the unit CPU onto the buffer of circuit TDB (FIG. 19, line 12). The circuit TDB in its turn sends the data to the circuit SPA with PA DTL (1A) FIG. 19, line 13, FIG. 14. The Acknowledge latch of the status register 521 is set again by PA DTL (1A) and the scanner adapter sends PA 1 ACKN (FIG. 19, line 14) to the circuit TDB (the circuit TDB does not respond). The level PA DTL (1A) is also gated with —ERR STAT BT16, OFF LINE —DEV ERR, and
—ERR STAT BT19, PSW ERR ON LINE, to give
ON LINE . DTL . PA ENA . —DEV ERR and its inverse.

This resultant signal is used to;

1. gate the data onto the SPA Data In Register 516 (FIG. 19, line 16)
2. start the operation of the SPA clock-timer 512, 513
3. set a divide by two flip flops such that if the scanner SPA receives two successive PA DTL (1A) signals without a RST ACKN (1A) in between, the PA 1 DEVICE ERR latch (FIG. 8, blocks 806, 807, FIG. 19, line 14) is set by —ERR STAT BT20, —RST ACK ERR to stop further operation of the scanner adapter SPA.

3. PA OPERATION

When SA ENA is true, the required scan signals from the SPA clocktimer 512, 513 are allowed through (FIG. 19, line 21, FIG. 18); errors relevant to the Scan Operation of the unit TSU trigger the PA 1 DEVICE ERR latch at ERR ENA SIG; and the Scan Data Out, SA 00 to SA 23, are gated into the SPA Data Out Multiplex 519.

With ON LINE . DTL . PA ENA true, the Scan Address is set into the SPA Data IN Register 516. The Decode circuits, BDCO, DECO and GS DECO translate the address fields (FIG. 19, line 16) and select only one of each group of drivers BDCO, BDCA, GSCA AND GSCO (FIG. 8, blocks 809, 810). If there is any selection errors (no selection or multiple selections) the 1 of N Check circuits for BDCO DECO and/or GS DECO indicate an error (FIG. 8, blocks 811–813) and set their respective error latches, —ERR STAT BT13 and/or —ERR STAT BT12.

It is to be noted that although the decoders have selected the switches equivalent to the Scan Address, these remain in their quiescent state until their respective Enable Signals appear.

The first clock-timer signal to appear, —BD ENA SIG. (FIG. 19, line 23) sets a BD ENA latch. When —BD ENA is false, the BDCO and BDCA circuits selected by the decoders switch ON and switch OFF, respectively. The signal —BD ENA SIG also sets the GSCA ENA latch such that when BDCA ENA is true, the selected GSCA circuit switches ON. After 8 microsec, for the switches to settle, the outputs of the 1 of N Check circuits for BDCO, BDCA, GSCA and GSCO are gated by 100N STRB 1 SIG to set respective latches in the SPA Error Status Word.

Next, when GSCO ENA SIG is true, the selected GSCO circuit switches ON (FIG. 8, block 814, FIG. 19, line 28). Then, when —GSCA ENA SIG is false, the signal resets the GSCA latch and when GACA ENA is false, the selected GSCA circuit switches OFF (FIG. 8, block 815, FIG. 19, line 29).

For those lines where the contacts of the repeating relay are closed, switching OFF the GSCA circuit causes the current to be diverted from the BDCO/GSCA path to the BDCO/GSCO path and thus through the cores. This sharp flow of current is transformed by the cores and the sense amplifiers SA into a pulse of about 3 microsec duration. After 1 microsec from the time GSCA ENA becomes false, a pulse of 1 microsec, —SA STRB SIG false, gates the Scan data (sense amplifier outputs) into the SA Register 517 (FIG. 19, line 30).

A second check on the correct selection of BDCO, BDCA, GSCA and GSCO circuits is made when 100N STRB 2 SIG true gates the outputs of the 1 of N Check circuits into their respective latches (FIG. 8, blocks 818–820, FIG. 19, line 31). The last signal in the PA Operation is ERR ENA SIG (FIG. 19, line 33) and this allows the OR'ed errors due to 1 of N Check circuits and the OR'd errors due to the malfunction of the clock-timer 512, 513 to set the PA 1 DEVICE ERR latch (FIG. 8, blocks 821–825).

PA DATA OUT (FIG. 13)

If there is no circuitry fault, the clock-timer 512, 513 continues and the scanner adapter SPA sends PA 1 LOAD DEV (FIG. 19, line 40) to the buffer TDB, where the signal gates the SPA Data Out onto the TDB Buffer 507 (FIG. 13, block 1301).

Also the adapter sends PA 1 SET READY (FIG. 19, line 41), the buffer TDB responding with RST ACKN (1A) (FIG. 19, line 42). The adaptor SPA uses this signal to generate RST ACK STRET (FIG. 19, line 43) and resets all its circuitry with RST ACK STRET + CLEAR.

On receipt of PA 1 LOAD DEV the buffer TDB sends a SENSE READY signal (FIG. 19, line 44) to the unit CPU indicating that there is data in its buffer 507. The unit CPU then initiates a CCI instruction to retrieve that data (FIG. 13, blocks 1304–1307).

For Maintenance

The Scan Operation for Maintenance is identical to that described earlier on with the exceptions that by the judicious use of Bits 8 to 12 and bits 14 and 15 of the Scan Data Word with the normal scan address fields, errors are induced in the 100N Check Circuits for the BDCO, DECO, GS DECO, BDCO BDCA, GSCA and GSCO and timing Check circuit. These errors set the appropriate latches of the SPA Error Status Word at either 100N STRB 1 SIG or 100N STRB 2 SIG error enable signal for the timing errors. Also at ERR ENA SIG these errors set the PA 1 DEVICE ERR latch causing the SPA Operation to cease.

Data In Loop Operations DIRECTIVE 1(1A) true. Referring to FIGS. 5, 5A, 14 and 21, this Directive enables a check to be made on the communication channels between the unit CPU and the scanner adaptor SPA via the Buffer TDB, the SPA Data In Register 516 and the SPA Data Out Multiplex 519.

This routine consists of four sequences.

1. PA SEL INST (FIGS. 11, 14, 15, FIG. 21, lines 11–16)

Figure 11:
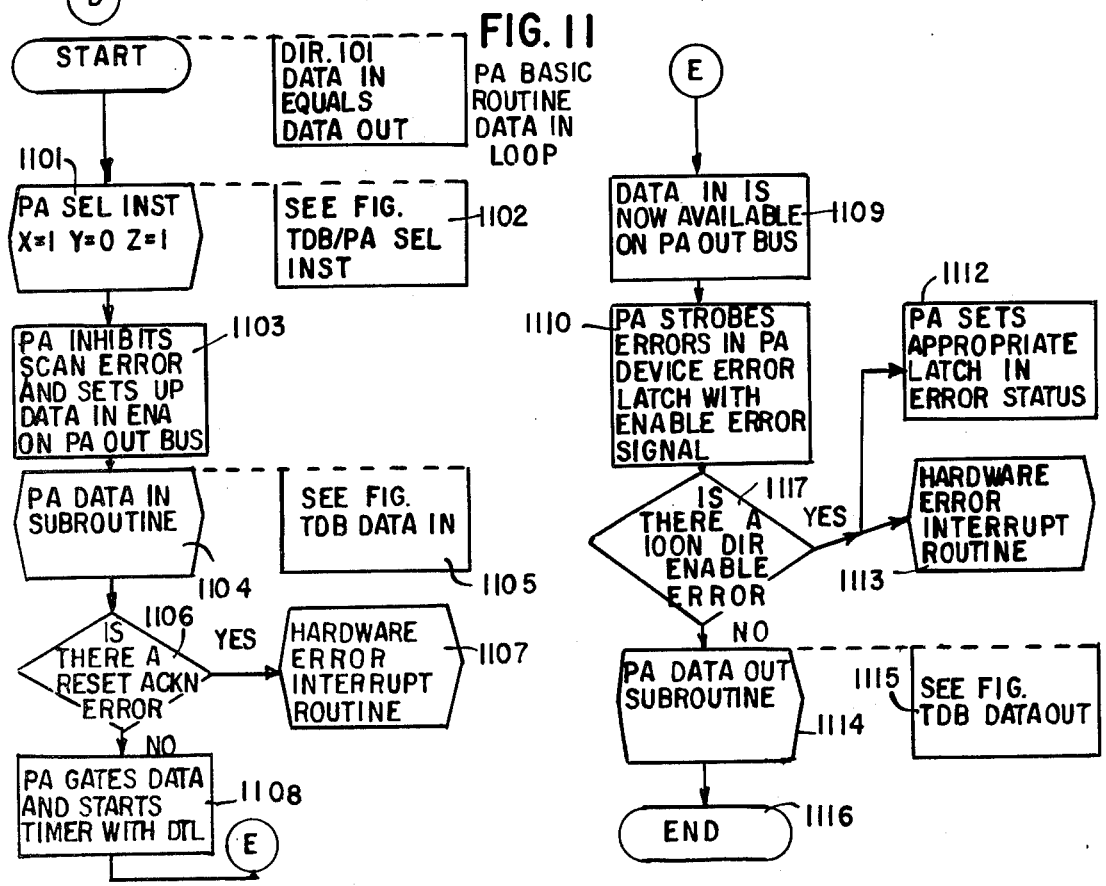
Figure 18:
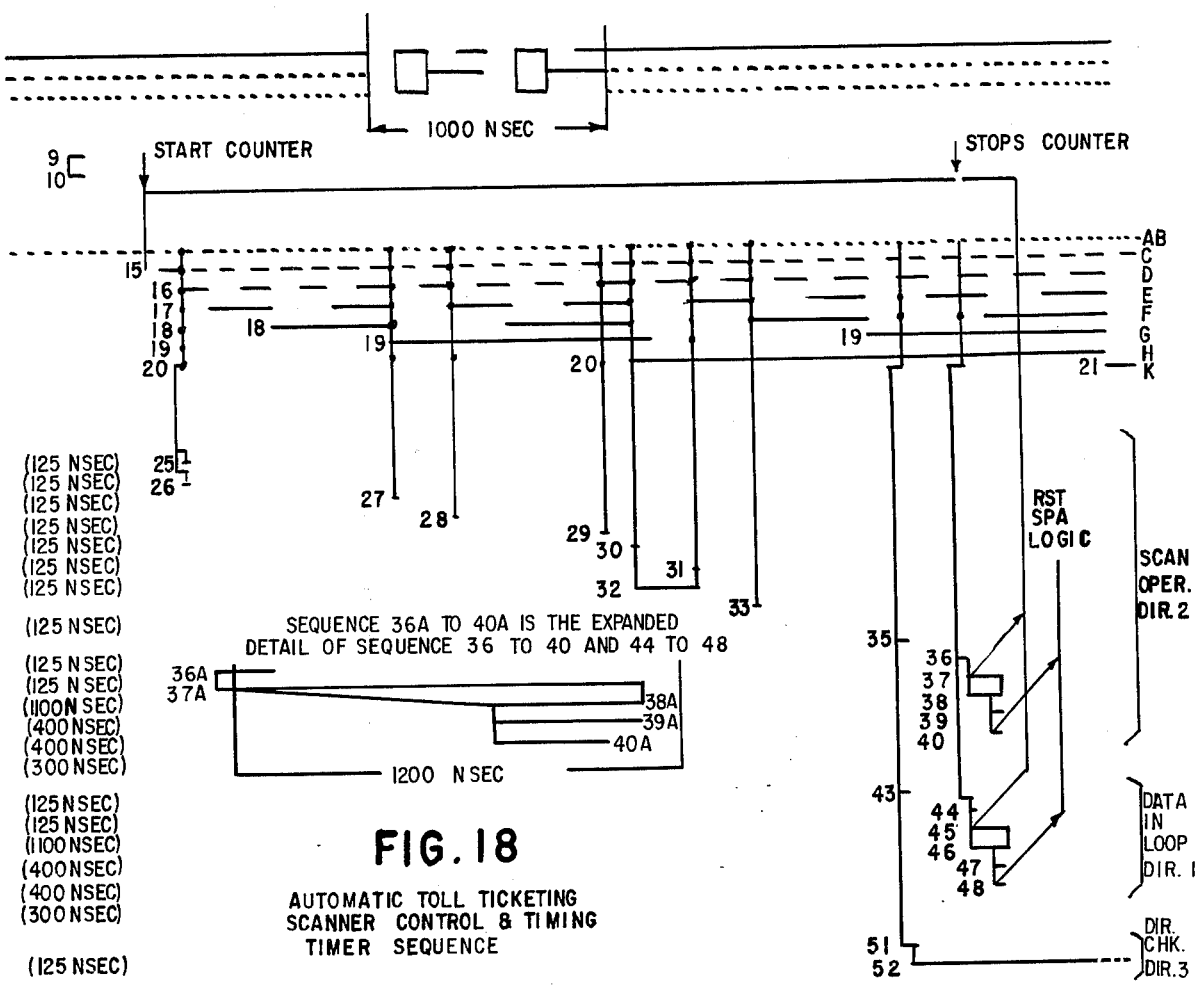

The routine is started at block 1101, FIG. 11, by a SEL INST with $X=1$, $Y=0$ and $Z=1$. The buffer TDB decodes these fields into only DIRECTIVE 1(1A) true and passes it on, with PA 1 EN, to the adaptor SPA. The adaptor SPA latches PA 1 EN into PA 1 ACKN and sends this response to the buffer TDB which in turn responds with RST ACKN (1A) (FIG. 15).

After stretching RST ACKN (1A) to a 1.1 microsec pulse, the scanner adaptor SPA uses RST ACK STRET + CLEAR to reset all its circuitry. The SPA also latches PA 1 ACKN into PA ENA REG. This latch is reset whenever PA 1 EN is false, such as before a SEL INST. The level PA ENA REG is used to enable gate DIRECTIVE 1(1A) into the scanner SPA. The output of the gate, DATA IN ENA true, (FIG. 11, block 1102) is fed to the 1 of N Directive Enable Check circuit 522 (FIG. 6A) to insure that only that Directive has been selected. If there is a fault, the output of the 1 of N Directive, Enable Check circuit 522 is gated by ENA ERR SIG just prior to the end of the operation of the scanner SPA when the output of a gate 100N DIR ENA GATED sets PA 1 DEVICE ERR and sets —ERR STAT BT 21 of the SPA Error Status register 521. With DATA IN ENA true, the data in the SPA Data In Register 516 is gated on SPA Data Output Multiplex 519. (FIG. 11, block 1103)

2. PA DATA IN (FIG. 14, FIG. 21, lines 19–23)

A data pattern is set up by the unit CPU onto the TDB Buffer 507 block 1401. The buffer TDB in its turn sends the data the the scanner SPA with PA DTL (1A) FIG. 14, block 1420 and FIG. 21, line 20. The Acknowledge latch is set again by PA DTL (1A) and the scanner adaptor SPA sends PA 1 ACKN to the buffer TDB. The buffer TDB does not respond (FIG. 14, block 1421, FIG. 21, line 21). The level PA DTL (1A) and is also gated with —ERR STA BT10, OFF LINE, —DEV ERR, and —ERR STAT BT19, PSW ERR ON LINE, to give ON LINE . DTL . PA ENA . —DEV ERR and its inverse. This resultant signal (FIG. 21, line 23): gates the data onto the SPA Data In Register 516, starts the operation of the SPA clock-timer 512, 513, and sets the divide by two flip flop, such that if the scanner SPA receives two PA DTL (1A) signals without a RST ACKN (1A) in between, the PA 1 DEVICE ERR latch is set by —ERR STAT BT20, —RST ACK ERR, and to stop further operation of the scanner SPA (FIG. 11, blocks 1106, 1108).

3. PA OPERATION (FIG. 11, blocks 1109–1113, FIG. 21, lines 28–31)

Because DIRECTIVE 1 (1A) is true, by necessity DIRECTIVE 2 (1A) is false which causes SA ENA to be false during the SPA operation of this Directive. This causes the clock-timer signals and errors associated with a scanning operation to be disabled. Therefore the scanner adaptor SPA just marks time until signal ENA ERR SIG becomes true, setting PA 1 DEVICE ERR if there is a fault in the SPA circuitry.

4. PA DATA OUT (FIG. 13, FIG. 21, lines 39–44)

If there is no circuitry faults, the clock-timer 512, 513 continues and the scanner SPA sends PA 1 LOAD DEV to the buffer TDB (FIG. 13, blocks 1301 to 1304) to gate the SPA Data Out on to the TDB Buffer 507 (FIG. 21, line 40).

Also, the scanner SPA sends PA 1 SET READY (FIG. 21, line 41) and the buffer TDB then responds with RST ACKN (1A) (FIG. 21, line 42). The scanner SPA uses this signal to generate RST ACK STRET and resets all its circuitry with RST ACK STRET + CLEAR (FIG. 21, line 43).

On receipt of PA 1 SET READY the buffer TDB sends to the unit CPU a SENSE READY signal indicating that there is data on its buffer. The unit CPU then initiates a CCI instruction to retrieve the Scan data, FIG. 21, line 42, and FIG. 13, blocks 1312–1314.

Directive 1 of N Check Operation DIRECTIVE 3 (1A) true (FIGS. 10, 14, 15 and 22)

This Directive effects a check of the operation of the 1 of N Directive Enable Check circuit 522, FIG. 6A, by inducing an artificial error.

This routine consists of two sequences.

1. PA SEL INST (FIG. 15)

Figure 10:
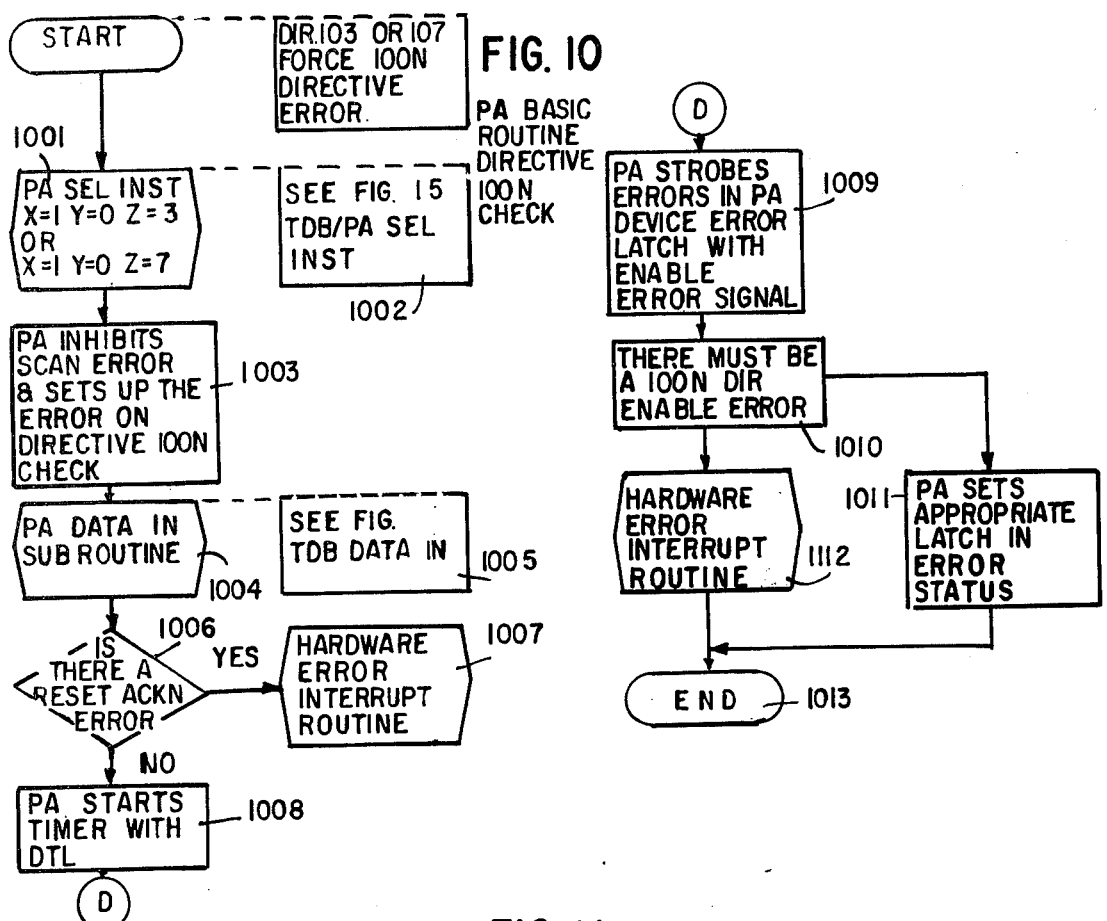

This routine is started by a SEL INST with $X = 1$, $Y = 0$, and $Z = 3$ (FIG. 10, block 1001). The buffer TDB decodes these fields into DIRECTIVE 3 (1A) true and passes the directive on, with PA 1 EN, to the scanner SPA, FIG. 15, blocks 1501–1519, FIG. 22, lines 7, 8. The scanner SPA latches PA 1 EN into PA 1 ACKN FIG. 22, line 9, and sends this signal (FIG. 22, line 9) to the buffer TDB which responds (FIG. 15, blocks 1520–1523) with RST ACKN (1A) FIG. 22, line 10. After stretching RST ACKN (1A), to a 1.1 microsec pulse (FIG. 22, line 11), the scanner SPA uses RST ACK STRET + CLEAR to reset all its circuitry. The scanner SPA also latches PA 1 ACKN into PA ENA REG of the status register 521 (FIG. 6A).

This latch is reset whenever PA 1 EN is false such as before a SEL INST. The level PA ENA REG is used to gate DIRECTIVE 3(1A). The output of the gate, DIRECTIVE 100N CHK is fed into two inputs of the 1 of N Directive Enable Check circuit whose output should indicate a fault FIG. 10, block 1003 and FIG. 22, line 12.

2. PA DATA IN (FIGS. 10 and 14)

The SEL INST is followed by a CCO instruction from the unit CPU. The data content of the CCO instruction is not important, all that is required is a DATA STROBE signal from the unit CPU (FIG. 14, block 1401) which causes the buffer TDB to generate a PA DTL (1A) (FIG. 14, block 1420, FIG. 22, line 16) to start the SPA clock-timer 512, 513, FIG. 22, line 24, FIG. 10, block 1008.

Most of the clock signals are disabled when SA ENA is false, SA ENA DIRECTIVE 2 (1A). PA ENA REG. Therefore, the scanner SPA just marks time until —ERR ENA SIG (FIG. 22, line 29 provided by delay timing 513 becomes true, which gates 100N DIR ENA (—100N DIR ENA GATED + 100N DIR ENA . ERR ENA SIG . —ERR STAT ENA), FIG. 10, block 1009.

The gated output, —100N DIR ENA GATED, sets PA1 DEVICE ERR latch and sets —ERR STAT BT21 of the SPA Error Status register 521. The other output of the Device Error latch, —DEV ERR, becomes false, stopping the clock 512 and any further operation of the scanner SPA, FIG. 22, line 30, FIG. 10, blocks 1010–1012.

As this is a Maintenance Routining Directive, it is usually followed by a DIRECTIVE 0(1A), Error Status Enable operation, described below, to check that —ERR STAT BT21 is true, l.e. that the 1 of N Directive Enable Check circuit is operational.

Directive 1 of N Check Operation DIRECTIVE 7(1A) true.

Referring to FIGS. 10, 14, 15 and 22, the purpose of this Directive is to check the operation of the 1 of N Directive Enable Check circuit by inducing an artificial error.

This routine consists of two sequences.

1. PA SEL INST

This routine is started by a SEL INST with $X = 1$, $Y = 0$ and $Z = 7$ (FIG. 10, block 1001). The buffer TDB decodes these fields into DIRECTIVE 7(1A) true (FIG. 15, blocks 1501–1519, FIG. 22, lines 7, 8) and passes it on, with PA 1 EN, to the scanner SPA. The scanner SPA latches PA 1 EN into PA 1 ACKN FIG. 22, line 9, and sends this signal (FIG. 22, line 9) to the buffer TDB which responds with RST ACKN (1A), FIG. 22, line 10, FIG. 15, blocks 1520–1523.

After stretching RST ACKN (1A), to a 1.1 microsec pulse (FIG. 22, line 11), the scanner SPA uses RST ACK STRET + CLEAR to reset all its circuitry. The scanner SPA also latches PA 1 ACKN into PA ENA REG. This latch is reset whenever PA 1 EN is false such as before a SEL INST. DIRECTIVE 7(1A) is not a directive recognized by the scanner SPA. Thus, the 1 of N DIRECTIVE check circuit 522 (FIG. 6A) detects a NO DIRECTIVE condition and should indicate a fault.

2. PA DATA IN (FIGS. 10 and 14)

The SEL INST is followed by a CCO instruction from the unit CPU. The data content of the CCO instruction is not important, all that is required is a DATA STROBE signal from the unit CPU (FIG. 14, block 1401) which causes the buffer TDB to generate a PA DTL (1A) (FIG. 14, block 1420, FIG. 22, line 16) which starts the SPA clock-timer 512, 513 (FIG. 22, line 24).

Most of the clock signals are disabled when SA ENA is false (SA ENA DIRECTIVE 2(1A) PA ENA REG). Therefore the scanner SPA just marks time until signal —ERR ENA SIG provided by delay timing 513 becomes true (FIG. 22, line 24). This signal gates 100N DIR ENA (—100N DIR ENA GATED + 100N DIR ENA . ERR ENA SIG . —ERR STAT ENA), FIG. 10, block 1009. The gated output, —100N DIR ENA GATED, sets PA1 DEVICE ERR latch and sets —ERR STAT BT22 of the SPA Error Status register 521. The other outputs of the Device Error latch, —DEV ERR, becomes false and the clock 512 is stopped, thereby inhibiting any further operation of the scanner SPA, FIG. 22, line 30, FIG. 10, blocks 1010–1012.

As this is a Maintenance Routining Directive, it is usually followed by a DIRECTIVE 0(1A), Error Status Enable operation, described below, to check that —ERR STAT BT 22 = 1, i.e. 1 of N Directive Enable Check circuit is operational.

Error Status Enable Operation DIRECTIVE 0(1A) true.

Referring to FIGS. 12, 15, 17 and 20, the scanner SPA indicates an error by generating a DEVICE ERR signal (FIG. 12, block 1201). This signal disables the SPA clock 512 and any further operation ceases until all the circuitry of the scanner SPA is cleared.

Software "time-out" FIG. 12, block 1202.

This routine consists of a single sequence which is started by a SEL INST with $X = 1$, $Y = 0$ and $Z = 0$ FIG. 12, block 1207, FIG. 20, line 15. The buffer decodes these fields into only DIRECTIVE 0 (1A) true (FIG. 15) and passes it on, with PA 1 EN, to the scanner SPA, FIG. 20, line 16.

Since the scanner SPA was stopped in action at DEVICE ERR, it is reasonable to assume that PA 1 ACKN is still high. If it is not, it is generated by the scanner SPA through its PA ACKN latch FIG. 20, line 17. In either case, responding with PA 1 ACKN is not important in the retrieval of the SPA Error Status.

When the scanner SPA receives DIRECTIVE 0(1A) and PA 1 EN, it generates an ERR STAT ENA level FIG. 20, line 19 which gates the ERR STAT BT00 to ERR STAT BT23 onto the Data Out Multiplex 519, FIG. 12, block 1209.

—ERR STAT BT21 and —ERR STAT BT22 in the SPA Error Status Word represent 1 of N errors in Directives, before and after DIRECTIVE 0 (1A), ERR STAT ENA, and enables determination of whether there was a Directive Error before the Error Status is interrogated and whether, when the Error Status is interrogated, only DIRECTIVE 0 (1A) is true. The latter constitutes a validity check on the SPA Error Status, because if —ERR STAT BT22 is true, this indicates that two Directives were enabled during the interrogation and therefore the Error Status would be the OR'ed result of both.

The inverse of the gating level is —ERR STAT BT23, —ERR STAT ENA. Thus, when the software analyzes the SPA Error Status, it is possible to determine whether DIRECTIVE 0 (1A) has been received correctly. There is no timing involved in this sequence apart from the gate delays in the logic circuits of the scanner SPA.

Through its own timing, the buffer TDB generates a LOAD PA pulse FIG. 20, line 20, which gates the SPA Data Out into the TDB buffer 507, FIG. 12, block 1210. After LOAD PA, the buffer TDB generates and sends RST ACKN (1A) to the scanner SPA which resets all its circuitry with RST ACK STRET + CLEAR. A SENSE READY signal from the buffer TDB to the unit CPU is not required. After about 1 microsec from the SEL INST, the unit CPU assumes that the data is on its Data Input Bus and retrieves the data FIG. 12, blocks 1211, 1212. The buffer TDB sends PA CLEAR (1A) FIG. 12, block 1216, FIG. 20, line 28, and the scanner SPA resets with PA CLEAR (1A) FIG. 20, line 30, FIG. 12, block 1217.

The SPA Data In is gated with —DEV ERR.

In the device buffer TDB, there is only one buffer that doubles up as storage for TDB Data In and TDB Data Out. The Data In could be the CCX data to the buffer TDB and peripheral adapter SPA data out of the adapter SPA to the buffer TDB and multiplex CCX or the TDB Error Status. The data out could be the data from the buffer TDB to the multiplex CCX of the data from the buffer TDB to the scan adapter SPA.

Thus, when the buffer TDB is sending data to the multiplex CCX, that data is also available at the inputs of the SPA Data In Register.

Now, if an error occurs in the scanner SPA and the TDB Error Status is requested, the buffer TDB puts its Error Status in the TDB buffer without resetting anything from its previous operation including DTL and PA 1 EN.

With DTL and PA 1 EN true, the input to the SPA Data In Reg. is enabled and therefore the TDB Error Status sets up in the SPA Data In Reg.

This TDB Error Status could be such that it causes a different SPA Error Status to be set up, i.e. if we have an SPA DEV ERR and we ask for TDB Error Status, and that status happens to have bits 9, 10, 11, or 12 set up, these are latched in the SPA Data In Reg. and could cause 1 of N BDCO DECO and/or 1 of N GS DECO errors to be simulated and latched in the SPA Error Status, even if those errors were not the original cause of the SPA Device Error.

Accordingly, SPA Data In is gated with —DEV ERR such that if the scanner SPA incurs an error, the gating of the Data In is inhibited.

We claim:
1. In a communication switching system including a switching network and common control equipment for establishing paths through the switching network between calling and called lines, said network including status means for indicating a busy condition for a given path through the network, scanning means responsive to calls-for-service from calling lines, and memory means for storing addresses of the lines requesting service, a ticketing arrangement comprising:
  monitoring means including a plurality of monitoring devices responsive to said status means for determining that a given path is busy;
  switching means for selectively connecting said monitoring devices to busy paths established between calling and called lines; and
  means responsive to the addresses stored in said memory means for controlling said switching means.

2. In a communication switching system including a switching network and a common control means for establishing paths through the switching network between calling and called lines, said network including status means for indicating a busy condition for a given path through the network, scanning means responsive to calls-for-service from calling lines, and memory means for storing addresses of lines requesting service, a ticketing arrangement comprising monitoring means including a plurality of monitoring devices responsive to said status means for determining that a given path is busy, switching means for connecting at least one of said monitoring devices to said busy path, means responsive to data signals provided by said common control means to address a predetermined group of said monitoring devices including at least one monitoring device connected to a busy path to determine the duration for which said busy path is maintained and for providing an indication to said common control means of said duration.

3. In a communication switching system including a switching network and a common control means for establishing paths through the switching network between calling and called lines and said network including status means for indicating a busy condition for a given path through the network, scanning means responsive to calls-for-service from calling lines, and memory means for storing addresses of lines requesting service, a ticketing arrangement comprising scanner means having monitoring means including a plurality of monitoring devices arranged in a matrix array between rows and columns of the matrix, switching means operable when enabled to connect at least one of said monitoring devices to a busy path, access means enabling selective addressing of said monitoring devices in groups and control means responsive to input data signals provided by said common control means to selectively enable the access means to interrogate a selected group of monitoring devices to provide an output data word indicating the status of the busy paths.

4. A system as set forth in claim 3 which includes input data register means for receiving input data signals from said common control means, including address data representing the address for a given one of said monitoring devices, and instruction data indicating an operation to be performed, and output data means for receiving the output data words provided by said monitoring devices to permit said output data word to be transmitted to said common control means.

5. A system as set forth in claim 4 wherein said access means includes a plurality of current source means connected to a first plurality of inputs of said matrix and a plurality of current sink means connected to a further plurality of inputs of said matrix.

6. A system as set forth in claim 5 wherein said data register means comprises a data register for receiving the address data provided by said common control means, and decoding means for decoding the address data received by said data register, said decoding means being operable to selectively enable addressed ones of said current sources and current sinks to enable interrogation of a given group of said monitoring devices.

7. A system as set forth in claim 3 wherein said common control means is operable to provide a plurality of different controls for said scanner means, said control means includes first means responsive to the instruction data to provide control signals for sequencing the operation of said scanner means.

8. A system as set forth in claim 7 wherein said first means includes timing means for generating control and timing pulses for controlling the operation of said scanner means.

9. A system as set forth in claim 8 wherein said data monitoring means includes output data register means and wherein said timing means is operable to enable the output data provided by said monitoring devices to be gated to said common control means from said output data register means.

10. A system as set forth in claim 6 wherein said control means includes error status means enabled whenever more than one of said current source means or said current sink means are enabled at a given time to provide a first error indication for said common control means.

11. A system as set forth in claim 6 wherein said control means includes error status means enabled whenever more than one instruction is received by said scanner means from said common control means at a given time.

12. A system as set forth in claim 8 wherein said control means includes error status means enabled in response to a fault in said scanner means to provide an error indication to said common control means and to inhibit further operation of said timing means.

13. In a communication switching system including a switching network and common control means for establishing paths through said switching network between calling and called lines, said network including means for indicating a busy condition for a given path through the network, scanning means responsive to calls-for-service from calling lines and memory means for storing addresses of the lines requesting service, a ticketing arrangement comprising monitoring means including a plurality of monitoring devices arranged in matrix form, matrix access means including first and second means operable when enabled to select at least one of said monitoring devices, switching means for connecting each monitoring device to a different one of said busy paths, input data register means for receiving an address from said common control means for effecting interrogation of a given one of said monitoring devices, control means responsive to an instruction signal provided by said common control means to provide a plurality of control signals, said input data register means being responsive to a first one of said control signals to enable the address provided by said common control means to be stored in said register means, first and second decoder means responsive to a further control signal provided by said control means for enabling said first and second access means, timing means responsive to a further control signal provided by said control means to provide timing signals for enabling said first and second decoder means in a predetermined sequence, and data register means responsive to an output data word provided by said selected monitoring devices for storing data indicating the condition of the busy path connected to said monitoring device.

14. In a communication switching system including a switching network and common control equipment for establishing paths through the switching network between calling and called lines, said network including status means for indicating a busy condition for a given path through the network, scanning means responsive to calls-for-service from calling lines, and memory means for storing addresses of the lines requesting service and the path through the network serving the lines, a method for monitoring the status of calling lines comprising: providing a plurality of monitoring devices each associated with a different one of said paths, connecting at least one of the monitoring devices to one of said busy paths, obtaining the address for a given line from the memory means, and using the address to interrogate the said one monitoring device to determine the status of said one busy path.

* * * * *